United States Patent
Kato et al.

(10) Patent No.: US 11,338,430 B2
(45) Date of Patent: May 24, 2022

(54) ARTICLE CARRYING ROBOT

(71) Applicant: Mitsubishi Electric Corporation, Tokyo (JP)

(72) Inventors: Shinichi Kato, Tokyo (JP); Hideto Iwamoto, Tokyo (JP); Naoya Tsukamoto, Tokyo (JP); Ian Emerson Random, Tokyo (JP); So Satoh, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 291 days.

(21) Appl. No.: 16/640,266

(22) PCT Filed: Sep. 11, 2017

(86) PCT No.: PCT/JP2017/032674
§ 371 (c)(1),
(2) Date: Feb. 19, 2020

(87) PCT Pub. No.: WO2019/049366
PCT Pub. Date: Mar. 14, 2019

(65) Prior Publication Data
US 2020/0361078 A1    Nov. 19, 2020

(51) Int. Cl.
*B25J 9/16* (2006.01)
*B25J 9/00* (2006.01)
(Continued)

(52) U.S. Cl.
CPC ............ *B25J 9/0009* (2013.01); *B25J 9/161* (2013.01); *B25J 11/008* (2013.01); *B25J 11/0015* (2013.01); *B25J 13/003* (2013.01)

(58) Field of Classification Search
CPC ........ B25J 9/161; B25J 11/008; B25J 9/0009; B25J 5/00; B25J 13/003; B25J 11/0015;
(Continued)

(56) References Cited

U.S. PATENT DOCUMENTS 5,146,065 A    9/1992  Motoki
6,034,355 A    3/2000  Naderi et al.
(Continued)

FOREIGN PATENT DOCUMENTS

JP    1-149869 U    10/1989
JP    10-208152 A    8/1998
(Continued)

OTHER PUBLICATIONS

Cai-Rui et al., Notice of Retraction: Discussion of equal-leg framed bent calculation by shear force distribution, 2010, IEEE, p. 758-759 (Year: 2010).*

(Continued)

*Primary Examiner* — McDieunel Marc
(74) *Attorney, Agent, or Firm* — Birch, Stewart, Kolasch & Birch, LLP

(57) ABSTRACT

Included are a bottom portion having a traveling portion, a body portion having a first pillar portion and a second pillar portion extending in a vertical direction, respectively, from one end and another end in a horizontal direction of the bottom portion, and a top portion including one end connected to an end of the first pillar portion opposite to the bottom portion and including another end connected to an end of the second pillar portion opposite to the bottom portion, an article storage portion that forms an opening with the first pillar portion, the second pillar portion, the top portion, and the bottom portion in such a way that the opening penetrates the body portion, and fixing portions provided in the first and second pillar portions to sandwich the opening and pair up with each other, for fixing an article storage auxiliary instrument.

11 Claims, 15 Drawing Sheets

(51) Int. Cl.
 *B25J 11/00* (2006.01)
 *B25J 13/00* (2006.01)
(58) Field of Classification Search
 CPC ...... B25J 9/1664; B61B 13/00; G05D 1/0297;
 G05D 1/0274; G05D 1/0248; G05D
 1/028; G05D 2201/0211
 See application file for complete search history.

(56) References Cited

U.S. PATENT DOCUMENTS

| | | | |
|---|---|---|---|
| 2007/0129849 | A1 | 6/2007 | Zini et al. |
| 2015/0202770 | A1 | 7/2015 | Patron et al. |
| 2021/0394363 | A1* | 12/2021 | Tsuboi .................. B25J 9/1664 |
| 2021/0402610 | A1* | 12/2021 | Lee ......................... B25J 11/008 |
| 2022/0001535 | A1* | 1/2022 | Anderson-Sprecher ... B25J 5/00 |

FOREIGN PATENT DOCUMENTS

| | | |
|---|---|---|
| JP | 2001-300876 A | 10/2001 |
| JP | 2002-517265 A | 6/2002 |
| JP | 2005-209090 A | 8/2005 |
| JP | 2005-296338 A | 10/2005 |
| JP | 2006-155039 A | 6/2006 |
| JP | 2006-232054 A | 9/2006 |
| JP | 2008-27382 A | 2/2008 |
| WO | WO 2012/169087 A1 | 12/2012 |

OTHER PUBLICATIONS

Jung et al., Si nano-pillars for measuring traction force exerted by filopodia, 2011, IEEE, p. 2754-2757 (Year: 2011).*
Tabkhi et al., Effect of micropillar with free-end on heat transfer, 2017, IEEE, p. 1-5 (Year: 2017).*
Riyadi et al., Silicon pillar thickness effect on vertical double gate MOSFET (VDGM) with oblique rotating implantation (ORI) method , 2008, IEEE, p. 475-479 (Year: 2008).*
International Search Report (PCT/ISA/210) issued in PCT/JP2017/032674, dated Oct. 3, 2017.
Extended European Search Report for European Application No. 17924448.8, dated Aug. 17, 2020.
Chinese Office Action dated Sep. 27, 2020 for Application No. 201780094624.6 with an English translation.

* cited by examiner

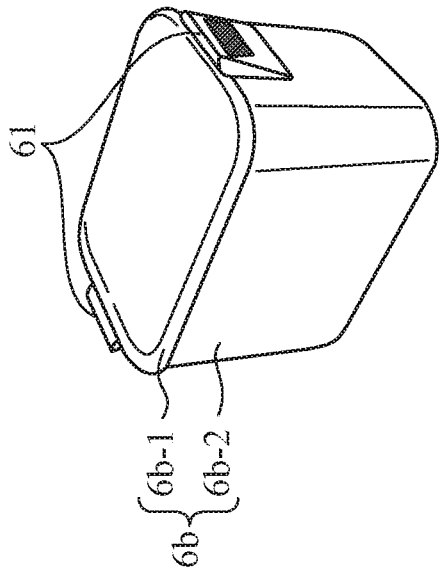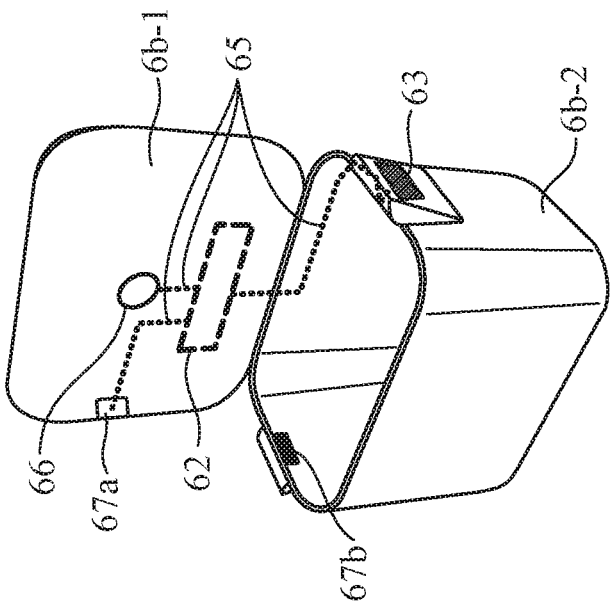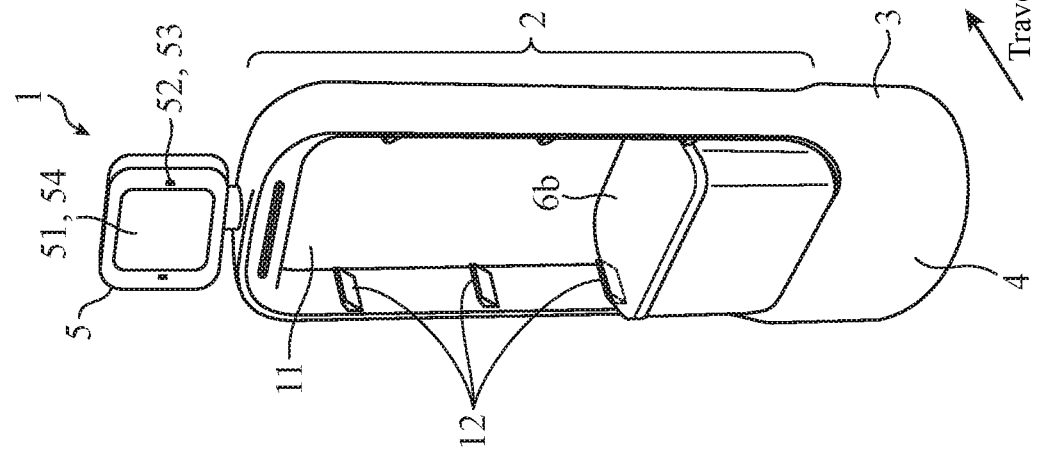

Waiting Screen

Waiting Screen (Blinking)

Waiting Screen
(Looking Right and Left)

Interaction Character Area

Interactive Screen (Speaking)

Transition from Waiting Screen to Information Display Screen

Interaction Character Area
Operation Guidance Screen

ARTICLE CARRYING ROBOT

TECHNICAL FIELD

The present disclosure relates to an article carrying robot that carries articles.

BACKGROUND ART

Conventionally, robots have been developed in a manufacturing field as devices that, in the form of an arm fixed to a base, move manufactured parts or the likes within a range in which the arm works. After that, with the development of rechargeable batteries, robots have been employed as devices that are used, in the form of self-propelled carts, for work of carrying manufactured parts in a manufacturing site, commodities in a physical distribution site, or the likes. In this specification, robots refer to devices that work by autonomously controlling and driving an actuator that converts electricity into a driving force.

It has been also expected that with the development of safety sensors in recent years, robots are employed as service robots that support the life of people in a daily life or a public situations. As one type of such a service robot, there are service robots (simply referred to as "article carrying robots" hereafter) that carry articles. Because article carrying robots carry articles for various users, such as elderly persons, children, or wheelchair users, the implementation of stable traveling is particularly required.

By the way, in Patent Literature 1, a food carrying instrument that prepares, stores, carries, rewarms, and serves a lot of food products in many sites is disclosed. This food carrying instrument has an inner wall disposed in the inside of a cart, and the inner wall partitions the inside of the cart into a front side compartment that can be approached from a front side door and a rear side compartment that can be approached from a rear side door.

CITATION LIST

Patent Literature

Patent Literature 1: Japanese Unexamined Patent Application Publication (Translation of PCT Application) No. 2002-517265

SUMMARY OF INVENTION

Technical Problem

Because the inside of the cart in the food carrying instrument disclosed in Patent Literature 1 is partitioned by the inner wall into the front side compartment and the rear side compartment, the center of gravity of the cart may be deviated depending upon how food products are placed inside the cart.

On the other hand, traveling devices included in recent article carrying robots travel not only in a frontward or backward direction but also in a lateral or oblique direction by using either a special wheel such as an omni wheel, or a method of driving each of wheels independently.

Therefore, a problem is that in a case in which the structure of the inside of a cart in a conventional food carrying instrument as disclosed in Patent Literature 1 is applied to an article carrying robot, there is a possibility that the center of gravity of the article carrying robot is deviated and it is impossible to implement stable traveling.

The present disclosure is made in order to solve the above-mentioned problem, and it is therefore an object of the present disclosure to provide an article carrying robot that can suppress a deviation of the center of gravity thereof when articles are stored.

Solution to Problem

An article carrying robot according to the present disclosure includes a bottom portion including a traveling portion, a body portion including a first pillar portion and a second pillar portion each extending in a vertical direction from one end and another end in a horizontal direction of the bottom portion, and a top portion including one end connected to an end of the first pillar portion that is opposite to the bottom portion and including another end connected to an end of the second pillar portion that is opposite to the bottom portion, an article storage portion that forms an opening with the first pillar portion, the second pillar portion, the top portion, and the bottom portion in such a way that the opening penetrates the body portion, and fixing portions provided in the first and second pillar portions to sandwich the opening and pair up with each other, for fixing an article storage auxiliary instrument, wiring provided inside the first and second pillar portions, for passing electric power and a control signal therethrough; and a terminal provided in the first pillar portion, the second pillar portion, the top portion, or an upper surface of the traveling portion, the terminal being connected to the wiring, wherein when the article storage auxiliary instrument is fixed to the fixing portions, the terminal is connected to an auxiliary instrument side terminal provided in the article storage auxiliary instrument, and the wiring and auxiliary instrument side wiring provided in the article storage auxiliary instrument are connected.

Advantageous Effects of Invention

According to the present disclosure, an article carrying robot that can suppress a deviation of the center of gravity when articles are stored can be provided.

BRIEF DESCRIPTION OF DRAWINGS

FIG. 3 are diagrams for explaining an example of an article storage auxiliary instrument fixed in an opening formed by an article storage portion of the article carrying robot of Embodiment 1.

FIG. 4 are diagrams explaining an example in a case of using a tray-shaped article storage auxiliary instrument as an article storage auxiliary instrument in Embodiment 1.

FIG. 5 are diagrams explaining an example in a case of using a box-shaped article storage auxiliary instrument as an article storage auxiliary instrument in Embodiment 1, FIG. 5A is a diagram showing an example of a state in which the article storage auxiliary instrument is fixed to the article carrying robot, FIG. 5B is an appearance perspective view of an example of a state in which a lid of the article storage auxiliary instrument is closed, and FIG. 5C is a diagram for explaining an example of the structure of the article storage auxiliary instrument;

FIG. 6 are diagrams explaining an example in a case of using a basket-shaped article storage auxiliary instrument as an article storage auxiliary instrument in Embodiment 1.

FIG. 7 are diagrams explaining an example in a case of using a basket-shaped article storage auxiliary instrument as an article storage auxiliary instrument in Embodiment 1.

FIG. 14 are diagrams for explaining an example of an article storage auxiliary instrument fixed in an opening formed by an article storage portion of the article carrying robot of Embodiment 2.

FIG. 15 are diagrams explaining an example in a case of using a storage-cabinet-shaped article storage auxiliary instrument as an article storage auxiliary instrument in Embodiment 2, FIG. 16 are diagrams explaining an example in a case of using a shelf-shaped article storage auxiliary instrument as an article storage auxiliary instrument in Embodiment 2.

DESCRIPTION OF EMBODIMENTS

Hereafter, in order to explain the present disclosure in greater detail, embodiments of the present disclosure will be described with reference to the accompanying drawings.

Embodiment 1

An article carrying robot according to Embodiment 1 is a service robot that carries articles.

Figure 1:
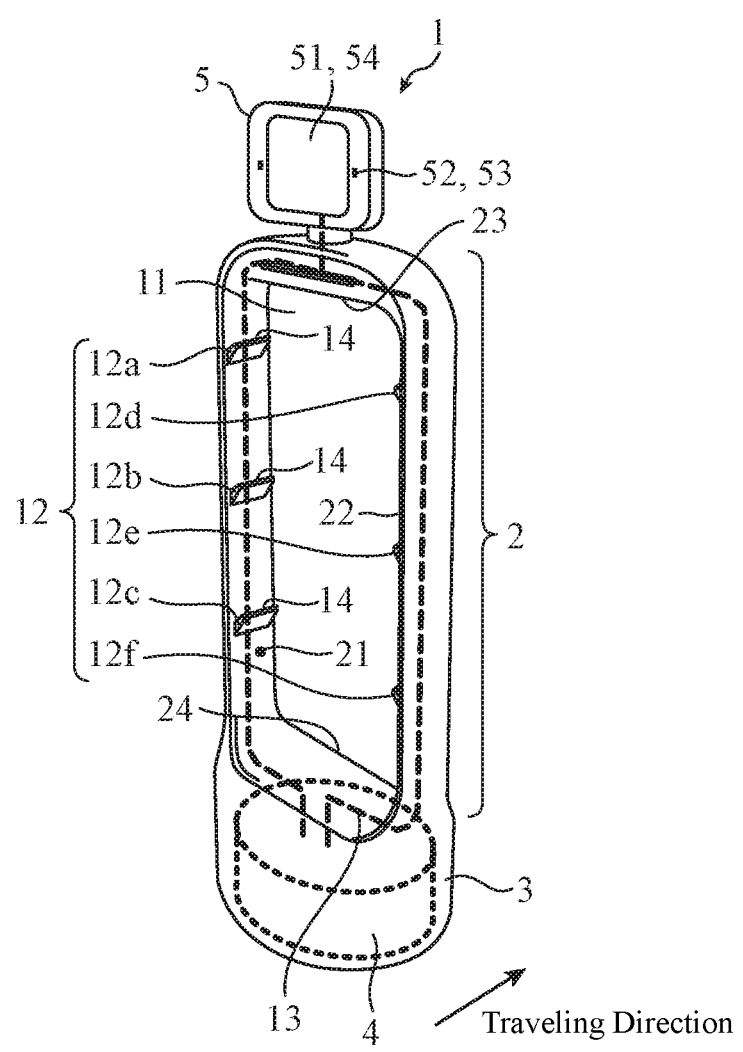
FIG. 1 is a perspective view showing an example of an overview of an article carrying robot of Embodiment 1.

FIG. 1 is a perspective view showing an example of an overview of an article carrying robot 1 of Embodiment 1.

The article carrying robot 1 has a body portion 2 and a traveling portion 3.

The body portion 2 of the article carrying robot 1 has an article storage portion 11 and fixing portions 12.

The article storage portion 11 forms an opening in such a way that the opening penetrates the body portion 2 in a horizontal direction.

In Embodiment 1, the article storage portion 11 forms an opening in such a way that the opening penetrates the body portion 2 in a horizontal direction parallel to a direction in which the traveling portion 3 travels. In Embodiment 1, the term "a horizontal direction" includes a substantially horizontal direction, and the term "parallel" includes substantially parallel.

The direction in which the traveling portion 3 travels is a direction that is designed in advance so as to be a traveling direction (forward direction) when the article carrying robot 1 travels a long distance or carries articles.

In Embodiment 1, it is assumed that, for example, the article carrying robot 1 travels behind and follows a user who is doing some shopping, and the user puts an article in and out of an article storage auxiliary instrument 6 (which will be mentioned later in detail) from the front, the article storage auxiliary instrument being fixed to the opening formed by the article storage portion 11 of the article carrying robot 1 positioned behind the user, while doing some shopping.

Therefore, in Embodiment 1, the opening formed by the article storage portion 11 of the article carrying robot 1 is open toward the direction in which the article carrying robot 1 travels.

In the opening formed by the article storage portion 11, one or more article storage auxiliary instruments 6 each of which is used for storing articles are fixed. The details of each article storage auxiliary instrument 6 will be mentioned later.

The body portion 2 has a first pillar portion 21, a second pillar portion 22, a top portion 23, and a bottom portion 24. The top portion 23 has a form in which one end is connected to an end of the first pillar portion 21 that is opposite to the bottom portion 24, and another end is connected to an end of the second pillar portion 22 that is opposite to the bottom portion 24. The bottom portion 24 has the traveling portion 3 while being a part of the body portion 2. The first pillar portion 21 and the second pillar portion 22 have a form in which the first and second pillar portions extend in a vertical direction, respectively, from one end and another end in a horizontal direction of the bottom portion 24.

The article storage portion 11 forms the opening by means of the first pillar portion 21, the second pillar portion 22, the top portion 23, and the bottom portion 24. More specifically, the periphery of the opening formed by the article storage portion 11 is defined by the first pillar portion 21, the second pillar portion 22, the top portion 23, and the bottom portion 24.

In the first pillar portion 21 and the second pillar portion 22, multiple fixing portions 12 for fixing the article storage auxiliary instruments 6 in the opening formed by the article storage portion 11 are disposed in such a way as to make one or more pairs with the opening formed by the article storage portion 11 being sandwiched by the one or more pairs. In FIG. 1, three pairs of fixing portions 12 are disposed as an example. In FIG. 1, fixing portions 12*a* and 12*d*, fixing portions 12*b* and 12*e*, and fixing portions 12*c* and 12*f* are paired up with each other. Two fixing portions 12 that are paired up with each other are disposed at the same height in the vertical direction in the first pillar portion 21 and the second pillar portion 22, and horizontally fix one article storage auxiliary instrument 6. In Embodiment 1, the term "the same height in the vertical direction" includes substantially the same height in the vertical direction, and the term "the vertical direction" includes a substantially vertical direction. The fixing portions 12 should just fix one article storage auxiliary instrument 6 to such an extent that articles stored in the article storage auxiliary instrument 6 are not caused to be inclined and deviated in their positions in a state in which the article storage auxiliary instrument 6 is fixed to the opening formed by the article storage portion 11. A concrete method of fixing an article storage auxiliary instrument 6 to fixing portions 12 will be mentioned later.

Wiring 13 is disposed inside the first pillar portion 21, the second pillar portion 22, the top portion 23, and the bottom portion 24 of the body portion 2. The wiring 13 is used for causing electric power from a rechargeable battery (not illustrated), and a control signal from a drive controlling device 4 (which will be mentioned later) included in the article carrying robot 1 to pass therethrough. The wiring 13 is connected, via terminals 14 (which will be mentioned later) that the body portion 2 has, to auxiliary instrument side wiring 65 (which will be mentioned later) that each article storage auxiliary instrument 6 has. Further, the wiring 13 is connected to the drive controlling device 4 (which will be mentioned later) and a user interface device 5 (which will be mentioned later) which are included in the article carrying robot 1.

In each fixing portion 12, a terminal 14 via which the electric power from the rechargeable battery and a control signal from the drive controlling device 4 are inputted or outputted is disposed. The terminal 14 is connected to an auxiliary instrument side terminal 63 (which will be mentioned later) that an article storage auxiliary instrument 6 has, so that the wiring 13 and the auxiliary instrument side wiring 65 that the article storage auxiliary instrument 6 has are electrically connected.

Although in Embodiment 1, a terminal 14 is disposed in every fixing portion 12 on the first pillar portion 21, as shown in FIG. 1, the position at which each terminal 14 is disposed is not limited to this example. In a case in which the supply of the electric power and the transmission of a control signal should just be performed only on some of the article storage auxiliary instruments 6 in accordance with a concrete application of the article carrying robot 1, a terminal 14 may be disposed in some of the fixing portions 12, for example.

Further, each terminal 14 should just be arranged at a position where the terminal can be connected to an auxiliary instrument side terminal 63 that an article storage auxiliary instrument 6 fixed to fixing portions 12 has, in such a way that the supply of the electric power and the transmission of a control signal from the wiring 13 to the article storage auxiliary instrument 6 can be performed. For example, the terminals 14 may be disposed only on the bottom portion 24, may be disposed only on either the first pillar portion 21 or the second pillar portion 22, or may be disposed on the top portion 23 and either the first pillar portion 21 or the second pillar portion 22.

The traveling portion 3 has a wheel, a caterpillar, or the like, and a device for driving the wheel, the caterpillar, or the like. The article carrying robot 1 of Embodiment 1 has a rechargeable battery, and can autonomously travel in a wireless manner because of the supply of electric power from this rechargeable battery to the drive controlling device 4 (which will be mentioned below) and the traveling portion 3.

The article carrying robot 1 includes the drive controlling device 4.

The drive controlling device 4 estimates the current position of the article carrying robot 1, and performs drive control of the article carrying robot 1. The drive controlling device 4 estimates the current position of the article carrying robot 1 on the basis of surrounding environment data acquired from a sensor (not illustrated) that recognizes a surrounding environment, and surrounding area map data stored in a surrounding area map data storage unit 44 (which will be mentioned later). The sensor that recognizes a surrounding environment is included in the article carrying robot 1. The sensor that recognizes a surrounding environment is, for example, an image shooting device such as a camera, a transmitter/receiver that transmits and receives a light beam such as an infrared light beam or a laser light beam, or a transmitter/receiver that transmits and receives an electric wave of a millimeter wave radar, WiFi (registered trademark), a beacon, or the like.

Figure 2:
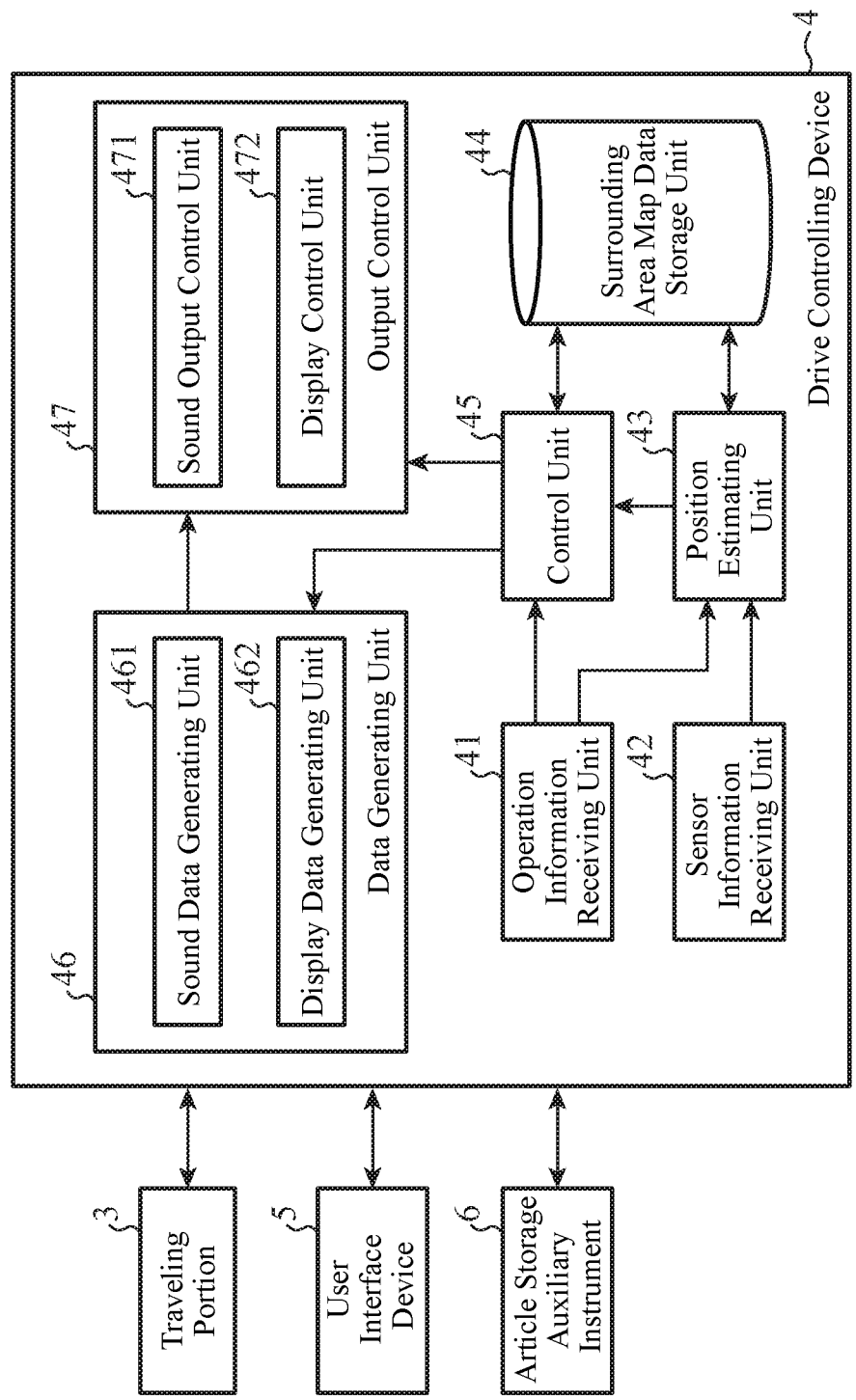
FIG. 2 is a diagram showing an example of the configuration of a drive controlling device that the article carrying robot includes in Embodiment 1.

Here, FIG. 2 is a diagram showing an example of the structure of the drive controlling device 4 that the article carrying robot 1 includes in Embodiment 1.

As shown in FIG. 2, the drive controlling device 4 has an operation information receiving unit 41, a sensor information receiving unit 42, a position estimating unit 43, the surrounding area map data storage unit 44, a control unit 45, a data generating unit 46, and an output control unit 47.

The data generating unit 46 has a sound data generating unit 461 and a display data generating unit 462. Further, the output control unit 47 has a sound output control unit 471 and a display control unit 472.

The operation information receiving unit 41 receives operation information outputted from the user interface device 5. A user inputs a desired operation from an input unit 54 of the user interface device 5, or the like. When receiving input of a desired operation from a user, the user interface device 5 outputs, as operation information, information about the operation to the drive controlling device 4 via the wiring 13, for example. The drive controlling device 4 receives the operation information. A desired operation that a user inputs from the user interface device 5 is, for example, an instruction to cause the article carrying robot 1 to travel toward a desired direction.

The operation information receiving unit 41 outputs the received operation information to the position estimating unit 43 and the control unit 45.

The sensor information receiving unit 42 receives surrounding environment data from the sensor. The sensor information receiving unit 42 outputs the received surrounding environment data to the position estimating unit 43.

When operation information about an instruction to cause the article carrying robot 1 to travel toward a desired direction is outputted from the operation information receiving unit 41, the position estimating unit 43 estimates the current position of the article carrying robot 1 on the basis of the surrounding environment data outputted from the sensor information receiving unit 42 and the surrounding area map data stored in the surrounding area map data storage unit 44. The position estimating unit 43 outputs information about the estimated current position to the control unit 45.

The surrounding area map data storage unit 44 stores the surrounding area map data.

In Embodiment 1, the surrounding area map data storage unit 44 is included in the drive controlling device 4, as shown in FIG. 2, but is not limited to this example, and the surrounding area map data storage unit 44 may be disposed at a location which is outside the drive controlling device 4 and where the surrounding area map data storage unit can be referred to by the drive controlling device 4.

The control unit 45 controls either various operations of the article carrying robot 1 or the operation of the user interface device 5 that the article carrying robot 1 includes.

For example, when operation information about an instruction to cause the article carrying robot 1 to travel toward a desired direction is outputted from the operation information receiving unit 41, the control unit 45 controls the traveling portion 3 on the basis of the current position estimated by the position estimating unit 43 and the surrounding area map data stored in the surrounding area map data storage unit 44, in such a way as to cause the article carrying robot 1 to travel toward the direction indicated by the operation information. In this way, the article carrying robot 1 autonomously travels in a wireless manner on the basis of the control by the drive controlling device 4.

The sound data generating unit 461 of the data generating unit 46 generates sound data that is to be outputted from a sound input/output unit 52 (which will be mentioned later) of the user interface device 5. The sound data generating unit 461 outputs the generated sound data to the sound output control unit 471 of the output control unit 47.

The display data generating unit 462 of the data generating unit 46 generates data for display that is to be displayed on a display unit 51 (which will be mentioned later) of the user interface device 5. The display data generating unit 462 outputs the generated data for display to the display control unit 472 of the output control unit 47.

The sound output control unit 471 of the output control unit 47 causes the sound input/output unit 52 of the user interface device 5 to output a sound based on the sound data outputted from the sound data generating unit 461.

The display control unit 472 of the output control unit 47 causes the display unit 51 of the user interface device 5 to display a display image based on the data for display outputted from the display data generating unit 462, or the like.

The explanation is returned to the explanation of FIG. 1.

On a surface of the top portion 23 of the body portion 2, the surface being opposite to a side of the opening formed by the article storage portion 11, the user interface device 5 is disposed.

The user interface device 5 is connected to the wiring 13. Electric power from the rechargeable battery is supplied to the user interface device 5 via the wiring 13. Further, a control signal outputted from the drive controlling device 4 is inputted to the user interface device 5 via the wiring 13, and information outputted from the user interface device 5 is inputted to the drive controlling device 4 via the wiring 13.

Although in FIG. 1 the user interface device 5 is disposed on the top portion 23, as mentioned above, this is only an example, and the user interface device 5 may be alternatively disposed on a surface of, for example, the first pillar portion 21 or the second pillar portion 22, the surface being opposite to a side of the opening formed by the article storage portion 11.

The user interface device 5 has the display unit 51, the sound input/output unit 52, a camera 53, and the input unit 54.

The display unit 51 is, for example, a display of light emitting diode (LED) light emission or a liquid crystal display, and displays, as an image, a video, or the like, information to be presented to a user.

The sound input/output unit 52 has a microphone and a speaker. The sound input/output unit 52 receives a voice or the like that a user has uttered in order to provide an instruction to perform a desired operation or the like. The sound input/output unit 52 also outputs, as a sound or the like, information to be presented to a user.

The camera 53 shoots an image of an area in the vicinity of the article carrying robot 1.

The input unit 54 is an input device such as operation buttons, and receives a desired operation from a user. The input unit 54 may be a touch panel disposed on the display unit 51.

When receiving a desired operation from a user, the sound input/output unit 52 and the input unit 54 output, as operation information, information about the desired operation received from the user to the drive controlling device 4.

Next, an article storage auxiliary instrument 6 that is attachably/detachably fixed by fixing portions 12 in the opening formed by the article storage portion 11 will be explained.

Figure 3A:
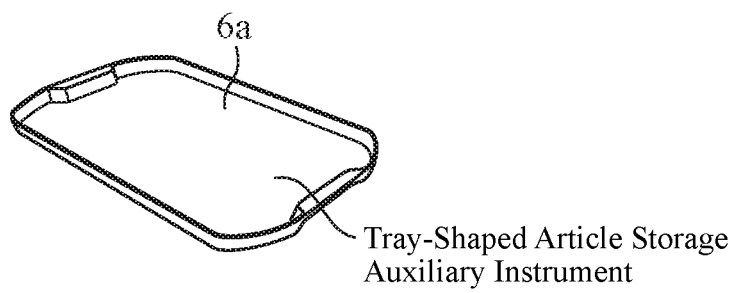
FIG. 3A shows an example of a tray-shaped article storage auxiliary instrument.
Figure 3B:
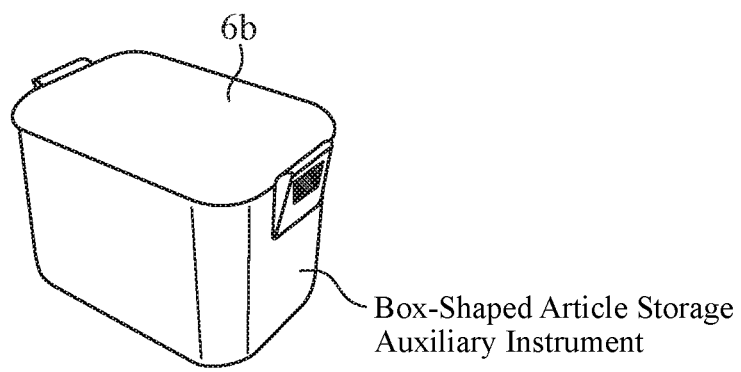
FIG. 3B shows an example of a box-shaped article storage auxiliary instrument.
Figure 3C:
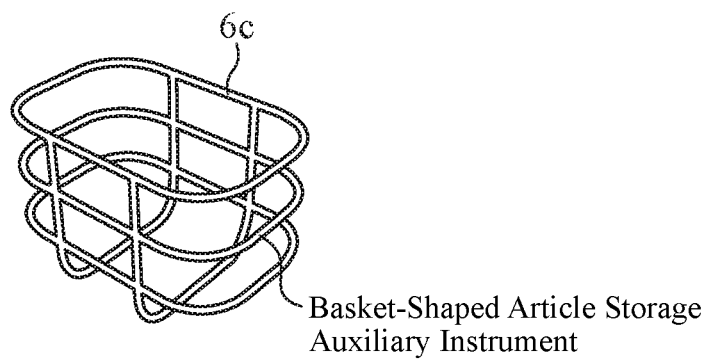
FIG. 3C shows an example of a basket-shaped article storage auxiliary instrument.

FIG. 3 is a diagram for explaining an example of an article storage auxiliary instrument 6 fixed in the opening formed by the article storage portion 11 of the article carrying robot 1 of Embodiment 1, FIG. 3A shows an example of a tray-shaped article storage auxiliary instrument 6a, FIG. 3B shows an example of a box-shaped article storage auxiliary instrument 6b, and FIG. 3C shows an example of a basket-shaped article storage auxiliary instrument 6c.

The article storage auxiliary instrument 6 is fixed in the opening formed by the article storage portion 11 of the article carrying robot 1, and stores articles or the likes carried by the article carrying robot 1.

Figure 4B:
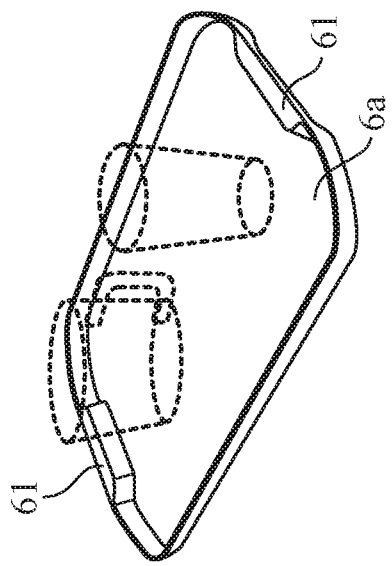
FIG. 4B is a diagram showing an example of a state in which articles are stored in the article storage auxiliary instrument.
Figure 4C:
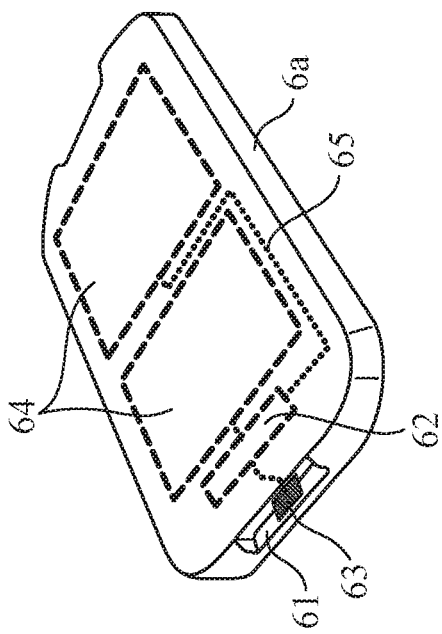
FIG. 4C is a diagram for explaining an example of the structure of the article storage auxiliary instrument.
Figure 4A:
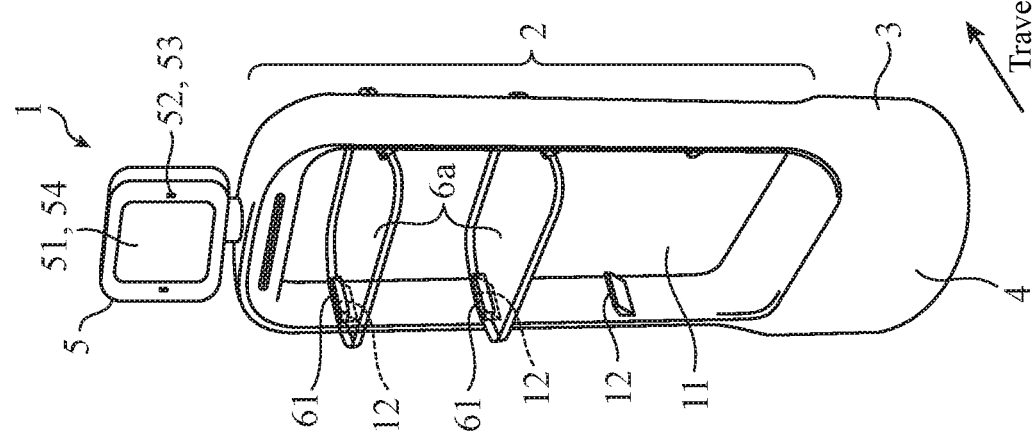
FIG. 4A is a diagram showing an example of a state in which the article storage auxiliary instrument is fixed to the article carrying robot.

FIG. 4 is a diagram explaining an example in a case of using a tray-shaped article storage auxiliary instrument 6a as shown in FIG. 3A as an article storage auxiliary instrument 6 in the article carrying robot 1 of Embodiment 1. FIG. 4A is a diagram showing an example of a state in which article storage auxiliary instruments 6a are fixed to the article carrying robot 1, FIG. 4B is a diagram showing an example of a state in which articles are stored in an article storage auxiliary instrument 6a, and FIG. 4C is a diagram for explaining an example of the structure of an article storage auxiliary instrument 6a. Each tray-shaped article storage auxiliary instrument 6a takes the form of a tray having a standing wall that is high to such an extent that an article stored in the article storage auxiliary instrument 6a does not fall because of the inertia when the article carrying robot 1 is travelling in a state in which the article storage auxiliary instrument 6a is fixed in the opening formed by the article storage portion 11.

As shown in FIG. 4B, on each side wall in a set of side walls facing each other of each article storage auxiliary instrument 6a, an auxiliary instrument side fixing portion 61 engaged with a fixing portion 12 is disposed.

When an article storage auxiliary instrument 6a is fixed in the opening formed by the article storage portion 11 of the article carrying robot 1, a pair of fixing portions 12 and the pair of auxiliary instrument side fixing portions 61 are engaged with each other, and the article storage auxiliary instrument 6a is placed in a state in which the article storage auxiliary instrument is fixed horizontally, as shown in FIG. 4A.

More specifically, the article storage auxiliary instrument 6a is horizontally fixed by the fixing portions 12 in the opening that is formed by the article storage portion 11 in such a way as to penetrate the body portion 2. As a result, because the articles stored in each article storage auxiliary instrument 6a can be arranged on the vertical line of the center of gravity of the article carrying robot 1, the article carrying robot 1 can suppress a deviation of the center of gravity and implement stable traveling.

Further, in a bottom portion of each article storage auxiliary instrument 6a, heat transfer elements 64 such as Peltier elements are arranged, as shown in FIG. 4C. In each of the auxiliary instrument side fixing portions 61, an auxiliary instrument side terminal 63 that can be connected to a terminal 14 is disposed. The number of heat transfer elements is determined depending on the size or the like of the article storage auxiliary instrument 6, and may be one or more.

The auxiliary instrument side terminals 63 and the heat transfer elements 64 are connected to a control board 62 by auxiliary instrument side wiring 65 arranged in the bottom portion of each article storage auxiliary instrument 6a.

When an article storage auxiliary instrument 6a is fixed in the opening formed by the article storage portion 11 of the article carrying robot 1, a terminal 14 and an auxiliary instrument side terminal 63 of the article storage auxiliary instrument 6a are connected, and the wiring 13 and the auxiliary instrument side wiring 65 in the article storage auxiliary instrument 6a are electrically connected.

When a control signal for causing temperature control to be performed is outputted from the drive controlling device 4, the control signal is inputted to the control board 62 via the auxiliary instrument side terminal 63 and the auxiliary instrument side wiring 65 of the article storage auxiliary instrument 6a. The control board 62 then controls the heat transfer elements 64 via the auxiliary instrument side wiring 65 on the basis of the inputted control signal.

Concretely, for example, a user inputs a desired set temperature from the input unit 54 of the user interface device 5, or the like. Information about the set temperature inputted from the input unit 54 or the like is outputted to the drive controlling device 4, and the operation information receiving unit 41 of the drive controlling device 4 receives the information about the set temperature as operation information. The control unit 45 of the drive controlling device 4 then outputs a control signal for setting the inside of the article storage auxiliary instrument 6a to the user's desired set temperature to the article storage auxiliary instrument 6a on the basis of the operation information. The control signal outputted from the drive controlling device 4 is inputted to the control board 62, as mentioned above, and the heat transfer elements 64 are controlled. As a result, the temperature in the article storage auxiliary instrument 6a becomes the user's desired set temperature, and the user can cause temperature control to set the articles stored in the article storage auxiliary instrument 6a to the desired temperature to be performed.

As mentioned above, the article carrying robot 1 of Embodiment 1 can provide the user with, as an added value, an article management service function of being able to perform temperature control on articles being carried, while implementing stable traveling. This article carrying robot 1 is a service robot that can provide the user with a carrying method that is more comfortable compared with that provided by physical distribution robots that simply carry articles.

FIG. 5 is a diagram explaining an example in a case of using a box-shaped article storage auxiliary instrument 6b as shown in FIG. 38 as an article storage auxiliary instrument 6 in the article carrying robot 1 of Embodiment 1. FIG. 5A is a diagram showing an example in a state in which the article storage auxiliary instrument 6b is fixed to the article carrying robot 1, FIG. 5B is an appearance perspective view of an example of a state in which a lid of the article storage auxiliary instrument 6b is closed, and FIG. 5C is a diagram for explaining an example of the structure of the article storage auxiliary instrument 6b. The box-shaped article storage auxiliary instrument 6b takes the form of a box that can store articles in such away as to cover all directions of the articles stored therein.

As shown in FIG. 5B, on each side wall of one set of side walls facing each other of a storage portion (6b-2 in FIG. 5B) of the article storage auxiliary instrument 6b, articles being stored in the storage portion, an auxiliary instrument side fixing portion 61 engaged with a fixing portion 12 is disposed.

When the article storage auxiliary instrument 6b is fixed in the opening formed by the article storage portion 11 of the article carrying robot 1, a pair of fixing portions 12 and the pair of auxiliary instrument side fixing portions 61 are engaged with each other, and the article storage auxiliary instrument 6b is placed in a state in which the article storage auxiliary instrument is fixed horizontally, as shown in FIG. 5A.

More specifically, the article storage auxiliary instrument 6b is horizontally fixed by the fixing portions 12 in the opening that is formed by the article storage portion 11 in such a way as to penetrate the body portion 2. As a result, because the articles stored in the article storage auxiliary instrument 6b can be arranged on the vertical line of the center of gravity of the article carrying robot 1, the article carrying robot 1 can suppress a deviation of the center of gravity and implement stable traveling.

As mentioned above, even in a case in which an article storage auxiliary instrument 6 is a box-shaped article storage auxiliary instrument 6b, the article carrying robot 1 can suppress a deviation of the center of gravity and implement stable traveling, just as in the case in which each article storage auxiliary instrument 6 is a tray-shaped article storage auxiliary instrument 6a.

Further, in the case in which an article storage auxiliary instrument 6 is a box-shaped article storage auxiliary instrument 6b, the article carrying robot 1 can provide the user with, as an added value, an article management service function of being able to perform storage management on articles being carried, while implementing stable traveling, as will be mentioned below. This article management service function will be explained below.

As shown in FIG. 5C, a thermometer 66 is disposed in the lid portion (6b-1 in FIG. 5C) of the article storage auxiliary instrument 6b. Although in FIG. 5C the case in which the thermometer 66 is disposed in the lid portion of the article storage auxiliary instrument 6b is shown as an example, a hygrometer may be disposed instead of the thermometer 66. Further, both the thermometer 66 and a hygrometer may be disposed in the lid portion of the article storage auxiliary instrument 6b.

Further, a control board 62 is disposed in the lid portion of the article storage auxiliary instrument 6b.

Further, an electric lock 67a is disposed in the lid portion of the article storage auxiliary instrument 6b, and a latch 67b for electric lock is disposed in the storage portion (6b-2 in FIG. 5C) of the article storage auxiliary instrument 6b.

Further, in each of the auxiliary instrument side fixing portions 61, an auxiliary instrument side terminal 63 that can be connected to a terminal 14 is disposed.

The auxiliary instrument side terminal 63, the thermometer 66, and the electric lock 67a are connected to the control board 62 by the lid portion 6b-1 of the article storage auxiliary instrument 6b and auxiliary instrument side wiring 65 arranged in the storage portion 6b-2.

When the article storage auxiliary instrument 6b is fixed in the opening formed by the article storage portion 11 of the article carrying robot 1, a terminal 14 and an auxiliary instrument side terminal 63 of the article storage auxiliary instrument 6b are connected, and the wiring 13 and the auxiliary instrument side wiring 65 in the article storage auxiliary instrument 6b are connected.

When a control signal for causing control of an opening or closing operation of the electric lock 67a to be performed is outputted from the drive controlling device 4, the control signal is inputted to the control board 62 via the auxiliary instrument side terminal 63 and the auxiliary instrument side wiring 65 of the article storage auxiliary instrument 6b. The control board 62 then controls the opening or closing operation of the electric lock 67a via the auxiliary instrument side wiring 65 on the basis of the inputted control signal.

Concretely, for example, a user inputs an instruction to open the lid of the article storage auxiliary instrument 6b from the input unit 54 of the user interface device 5. The instruction to open the lid, which is inputted from the input unit 54, is outputted to the drive controlling device 4, and the operation information receiving unit 41 of the drive controlling device 4 receives, as operation information, the instruction to open the lid. The control unit 45 of the drive controlling device 4 then outputs a control signal for opening the electric lock 67a of the article storage auxiliary instrument 6b to the article storage auxiliary instrument 6b on the basis of the operation information. The control signal outputted from the drive controlling device 4 is inputted to the control board 62, as mentioned above, and the opening or closing operation of the electric lock 67a is controlled.

Further, when a control signal for making a request for information about the temperature in the article storage auxiliary instrument 6b is outputted from the drive controlling device 4, the control signal is inputted to the control board 62 via the auxiliary instrument side terminal 63 and the auxiliary instrument side wiring 65 of the article storage auxiliary instrument 6b. The control board 62 then outputs the information about the temperature in the article storage auxiliary instrument 6b that the thermometer 66 measures, via the auxiliary instrument side wiring 65, to the drive controlling device 4 on the basis of the inputted control signal.

Concretely, for example, a user inputs a temperature display instruction to display the information about the temperature in the article storage auxiliary instrument 6b from the input unit 54 of the user interface device 5. The temperature display instruction inputted from the input unit 54 is outputted to the drive controlling device 4, and the operation information receiving unit 41 of the drive controlling device 4 receives the temperature display instruction as operation information. The control unit 45 of the drive controlling device 4 then outputs a control signal showing the temperature display instruction to the article storage auxiliary instrument 6b on the basis of the operation information. The control signal outputted from the drive controlling device 4 is inputted to the control board 62, as mentioned above, and the control board 62 acquires the information about the temperature in the article storage auxiliary instrument 6b that the thermometer 66 measures and outputs the temperature information to the drive controlling device 4.

The temperature information outputted from the control board 62 is inputted to the drive controlling device 4 via the auxiliary instrument side terminal 63 of the article storage auxiliary instrument 6b, the terminal 14, and the wiring 13.

A storage information acquiring unit (not illustrated) of the drive controlling device 4 acquires the temperature information outputted from the control board 62, and outputs the temperature information to the control unit 45. The control unit 45 causes the display unit 51 of the user interface device 5 to display a temperature numerical value based on the temperature information outputted from the storage information acquiring unit.

As a result, the user can know the temperature in the article storage auxiliary instrument 6b by checking the display unit 51, and can check the status of storage of articles.

For example, when the user desires to change the set temperature in the article storage auxiliary instrument 6b as a result of checking the status of storage of the articles in the article storage auxiliary instrument 6b, the user can input a desired set temperature from the input unit 54 of the user interface device 5, to change the set temperature in the article storage auxiliary instrument 6b. Because a concrete operation of changing the set temperature in the article storage auxiliary instrument 6b is the same as that in the case of a tray-shaped article storage auxiliary instrument 6a, a detailed explanation will be omitted. Although not illustrated in FIG. 5C, a heat transfer element 64 is disposed inside either the lid portion 6b-1 or the storage portion 6b-2 of the article storage auxiliary instrument 6b.

As mentioned above, the article carrying robot 1 of Embodiment 1 can provide the user with, as an added value, an article management service function of being able to perform control of the storage condition on articles being carried, while implementing stable traveling. This article carrying robot 1 is a service robot that can provide the user with a carrying method that is more comfortable compared with that provided by physical distribution robots that simply carry articles.

Figure 6B:
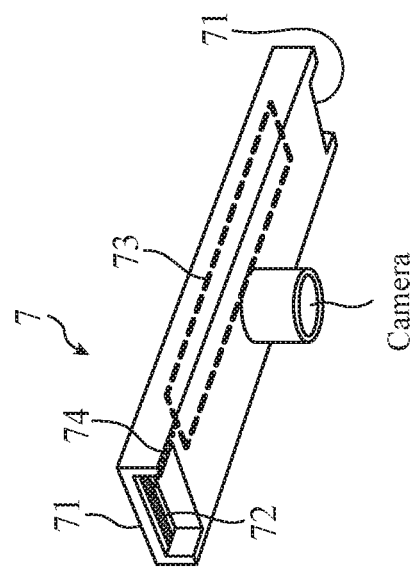
FIG. 6B is a diagram for explaining an example of the structure of a camera unit that monitors a state of articles in the article storage auxiliary instrument.
Figure 6C:
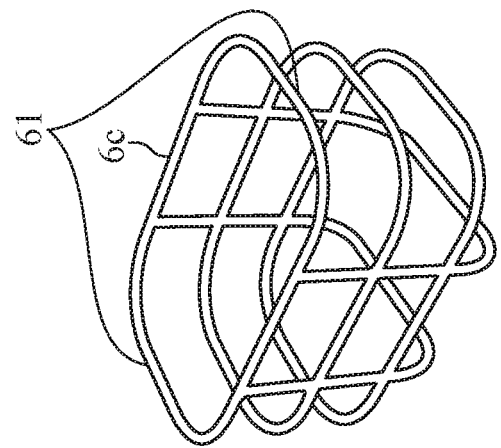
FIG. 6C is a diagram for explaining an example of the structure of the article storage auxiliary instrument.
Figure 6A:
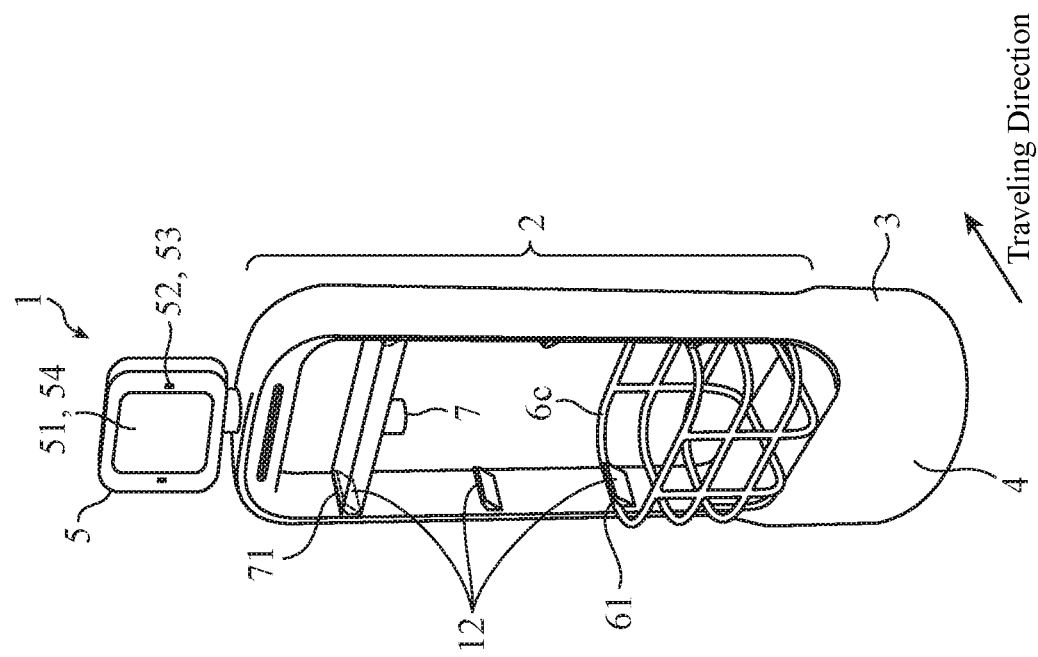
FIG. 6A is a diagram showing an example of a state in which the article storage auxiliary instrument is fixed to the article carrying robot.

FIG. 6 is a diagram explaining an example in a case of using a basket-shaped article storage auxiliary instrument 6c as shown in FIG. 3C as an article storage auxiliary instrument 6 in Embodiment 1. FIG. 6A is a diagram showing a state in which the article storage auxiliary instrument 6c is fixed to the article carrying robot 1, FIG. 6C is a diagram for explaining the structure of the article storage auxiliary instrument 6c, and FIG. 6B is a diagram for explaining the structure of a camera unit 7 that monitors the state of articles in the article storage auxiliary instrument 6c.

As shown in FIG. 6C, each of portions of the basket of the article storage auxiliary instrument 6c, the portions facing each other and pairing up with each other, serves as an auxiliary instrument side fixing portion 61 engaged with a fixing portion 12.

When the article storage auxiliary instrument 6c is fixed in the opening formed by the article storage portion 11 of the article carrying robot 1, a pair of fixing portions 12 and the pair of auxiliary instrument side fixing portions 61 are engaged with each other, and the article storage auxiliary instrument 6c is placed in a state in which the article storage auxiliary instrument is fixed horizontally, as shown in FIG. 6A.

Each fixing portion 12 has, for example, a nail-like shape, and an auxiliary instrument side fixing portion 61 of the article storage auxiliary instrument 6c is hooked on the fixing portion 12. Further, for example, the auxiliary instrument side fixing portions 61 of the article storage auxiliary instrument 6c may be handles each having a hole, the handles being formed at positions facing each other in the basket of the article storage auxiliary instrument 6c.

When the article storage auxiliary instrument 6c is fixed to the opening formed by the article storage portion 11, one pair of fixing portions 12 is hooked on the holes of the pair of auxiliary instrument side fixing portions 61 of the article storage auxiliary instrument 6c, and the article storage auxiliary instrument 6c is placed in a state in which the article storage auxiliary instrument is fixed horizontally.

Each of the article storage auxiliary instruments 6a and 6b as shown in FIGS. 3A and 38 has a function of acting on articles, such as a function of performing temperature control of stored articles or management of the storage condition of stored articles by applying heat or the like, as explained using FIGS. 4 and 5. In contrast with this, the article storage auxiliary instrument 6c does not have a function of acting on articles, but has only a function of storing articles.

Therefore, for example, the camera unit 7 as shown in FIG. 3C can be used as an article monitoring device that monitors the state of the articles stored in the article storage auxiliary instrument 6c. The camera unit 7 is attachably/detachably fixed in a horizontal direction by one pair of fixing portions 12 in the opening formed by the article storage portion 11, like the article storage auxiliary instrument 6c.

As shown in FIG. 6C, the camera unit 7 has, for example, a housing, and on each of side walls of the housing, the side walls facing each other, a unit side fixing portion 71 engaged with a fixing portion 12 is disposed. In each of the unit side fixing portions 71, a unit side terminal 72 that can be connected to a terminal 14 is disposed.

Further, a control board 73 is included inside the housing of the camera unit 7.

The unit side terminals 72 are connected to the control board 73 by unit side wiring 74 arranged inside the camera unit 7.

Further, the camera unit 7 includes a camera 75 on one surface of the housing.

When the camera unit 7 is fixed to the opening formed by the article storage portion 11 of the article carrying robot 1, a terminal 14 and a unit side terminal 72 of the camera unit 7 are connected, and the wiring 13 and the unit side wiring 74 in the camera unit 7 are electrically connected.

When the camera unit 7 is fixed in the opening formed by the article storage portion 11, the camera 75 that the camera unit 7 includes is placed in a state in which the camera is fixed in such a way as to face the article storage auxiliary instrument 6c fixed to the opening formed by the article storage portion 11, as shown in FIG. 6A.

When a control signal for causing shooting control for shooting an image of the articles stored in the article storage auxiliary instrument 6c to be performed is outputted from the drive controlling device 4, the control signal is inputted to the control board 73 via a unit side terminal 72 and the unit side wiring 74 of the camera unit 7. The control board 73 then outputs an image shooting instruction to the camera 75 on the basis of the inputted control signal. The camera 75 starts shooting an image.

Concretely, for example, a user inputs an image shooting instruction to make a request for an image acquired by shooting the articles stored in the article storage auxiliary instrument 6c from the input unit 54 of the user interface device 5, or the like.

The image shooting instruction inputted from the input unit 54 or the like is outputted to the drive controlling device 4, and the operation information receiving unit 41 of the drive controlling device 4 receives the image shooting instruction as operation information. The control unit 45 of the drive controlling device 4 then outputs a control signal showing the image shooting instruction to the camera unit 7 on the basis of the operation information. The control signal outputted from the drive controlling device 4 is inputted to the control board 73, as mentioned above, and the control board 73 causes the camera 75 to shoot an image of the articles stored in the article storage auxiliary instrument 6c. The control board 73 then acquires the image shot by the camera 75, and so on, and outputs the image and so on to the drive controlling device 4.

The image information outputted from the control board 73 is inputted to the drive controlling device 4 via a unit side terminal 72 of the camera unit 7, a terminal 14, and the wiring 13.

An image acquiring unit (not illustrated) of the drive controlling device 4 acquires the image information outputted from the control board 62, and outputs the image information to the control unit 45. The control unit 45 causes the display unit 51 of the user interface device 5 to display an image based on the image information outputted from the image acquiring unit.

As a result, the user can see an image or the like that is acquired by shooting the inside of the article storage auxiliary instrument 6b from above, by checking the display unit 51. As a result, the user can check the state of the articles in the article storage auxiliary instrument 6c without having to look into the article storage auxiliary instrument 6c from above the article storage auxiliary instrument 6c.

As mentioned above, the article carrying robot 1 of Embodiment 1 can provide the user with, as an added value, an article monitoring service function of being able to perform monitoring of a state on articles being carried, while implementing stable traveling. This article carrying robot 1 is a service robot that can provide the user with a carrying method that is more comfortable compared with that provided by physical distribution robots that simply carry articles.

Although in Embodiment 1 the example in which, as mentioned above, the camera unit 7 is horizontally fixed, as an article monitoring device, by one pair of fixing portions 12 in the opening formed by the article storage portion 11, like the article storage auxiliary instrument 6c, is explained, this is only an example. For example, a lighting unit, a temperature controlling unit, or a payment unit may be attachably/detachably fixed in a horizontal direction by one pair of fixing portions 12 in the opening that is formed by the article storage portion 11 in such a way as to penetrate the body portion 2 of the article carrying robot 1.

Further, a camera unit 7, a lighting unit, a temperature controlling unit, a payment unit, or the like as mentioned above may be mounted in the opening formed by the article storage portion 11, together with a tray-shaped or box-shaped article storage auxiliary instrument 6a or 6b as explained with FIG. 4 or 5.

The lighting unit, the temperature controlling unit, and the payment unit have housings that are similar to that of the camera unit 7.

In the lighting unit, a portion corresponding to the camera 75 of the camera unit 7 is LED lighting equipment and a human detection sensor. The human detection sensor detects a motion of a person's hand when the person places an article in the article storage auxiliary instrument 6c or takes an article out of the article storage auxiliary instrument 6c, and the LED lighting equipment illuminates the article storage auxiliary instrument 6c, thereby improving the workability of storing operations.

The temperature controlling unit includes a heat transfer element, such as a Peltier element, in the housing thereof, and a portion of the temperature controlling unit corresponding to the camera 75 of the camera unit 7 is an air blower. With these, the articles stored in the article storage auxiliary instrument 6c are cooled or heated.

In the payment unit, a portion corresponding to the camera 75 of the camera unit 7 is an IC tag reader 68 (which will be mentioned later). By storing an article in the article storage auxiliary instrument 6c after the IC tag reader 68 reads an IC tag 69 (which will be mentioned later) showing price information and preattached to the article, the user finishes payment during shopping.

Although the example in which the basket-shaped article storage auxiliary instrument 6c does not have a function of acting on articles is explained above, the basket-shaped article storage auxiliary instrument can be modified to have a function of acting on articles. Hereafter, an explanation will be made with an example.

As an example, a case in which an article checking service function of checking a status of use inside the article storage auxiliary instrument 6d by using a basket-shaped article storage auxiliary instrument 6d can be added to the article carrying robot 1 will be explained.

Figure 7B:
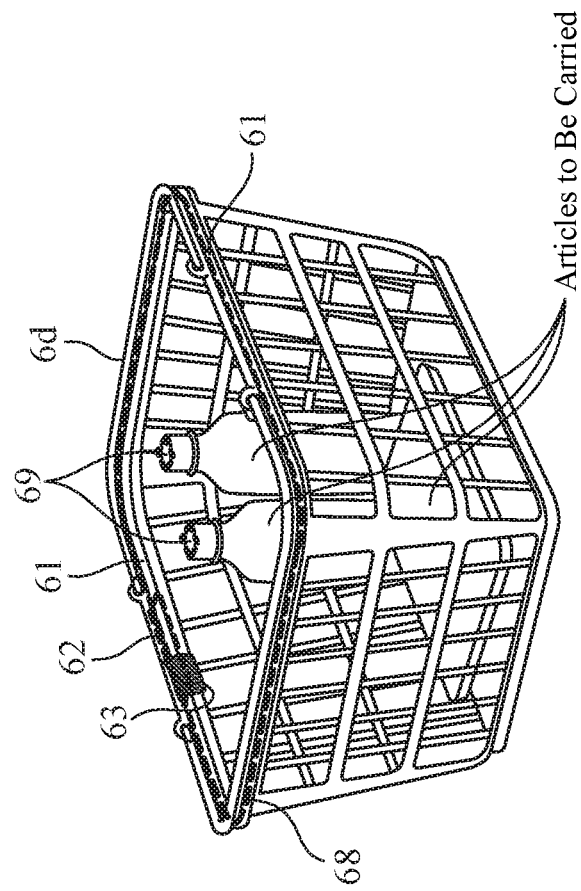
FIG. 7B is a diagram for explaining an example of the structure of the article storage auxiliary instrument.
Figure 7A:
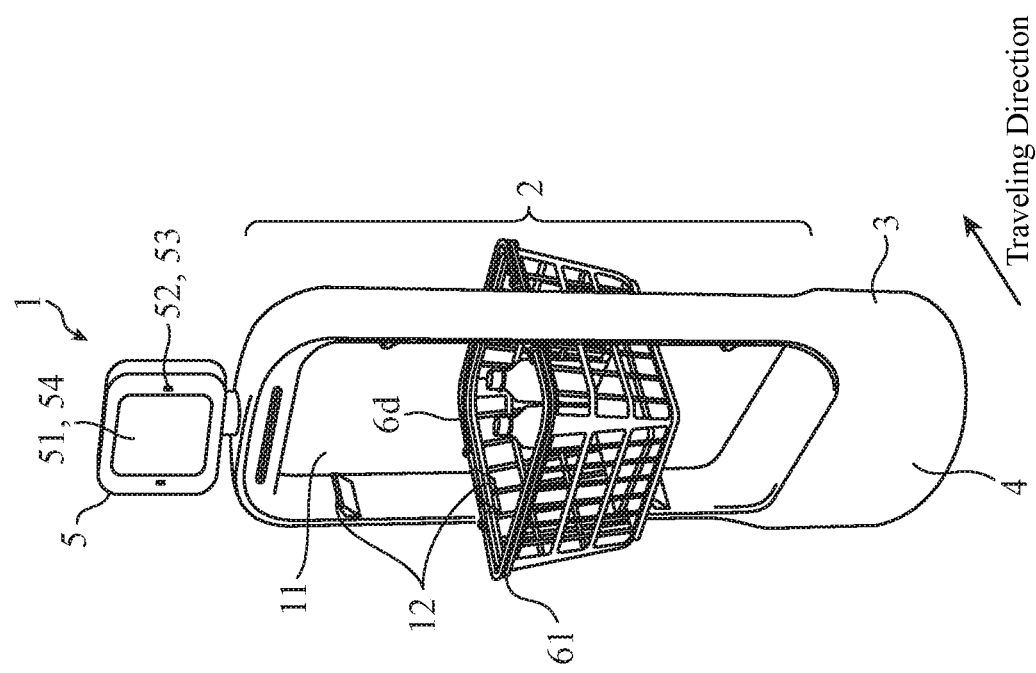
FIG. 7A is a diagram showing an example of a state in which the article storage auxiliary instrument is fixed to the article carrying robot.

FIG. 7 is a diagram explaining an example in a case of using a basket-shaped article storage auxiliary instrument 6d as an article storage auxiliary instrument 6 in Embodiment 1. FIG. 7A is a diagram showing an example of a state in which the article storage auxiliary instrument 6d is fixed to the article carrying robot 1, and FIG. 7B is a diagram for explaining an example of the structure of the article storage auxiliary instrument 6d.

As shown in FIG. 7B, on each side wall of one set of side walls facing each other of the article storage auxiliary instrument 6a, an auxiliary instrument side fixing portion 61 engaged with a fixing portion 12 is disposed.

When the article storage auxiliary instrument 6d is fixed in the opening formed by the article storage portion 11 of the article carrying robot 1, a pair of fixing portions 12 and the pair of auxiliary instrument side fixing portions 61 are engaged with each other, and the article storage auxiliary instrument 6d is placed in a state in which the article storage auxiliary instrument is fixed horizontally, as shown in FIG. 7A. In each of the auxiliary instrument side fixing portions 61, an auxiliary instrument side terminal 63 connected to a terminal 14 is disposed.

Further, as shown in FIG. 7B, auxiliary instrument side wiring 65 is disposed inside a part of the article storage auxiliary instrument 6d, the part serving as an opening portion for articles via which an article is put in or out, and a control board 62 and an IC tag reader 68 are disposed at arbitrary locations of the part serving as the opening portion for articles.

The auxiliary instrument side terminals 63 and the IC tag reader 68 are connected to the control board 62 by the auxiliary instrument side wiring 65.

When the article storage auxiliary instrument 6d is fixed in the opening formed by the article storage portion 11 of the article carrying robot 1, a terminal 14 and an auxiliary instrument side terminal 63 of the article storage auxiliary instrument 6d are connected, and the wiring 13 and the auxiliary instrument side wiring 65 in the article storage auxiliary instrument 6d are electrically connected.

When a control signal for causing the status of use of the storage auxiliary instrument 6d to be checked is outputted from the drive controlling device 4, the control signal is inputted to the control board 62 via the auxiliary instrument side terminal 63 and the auxiliary instrument side wiring 65 of the article storage auxiliary instrument 6d. The control board 62 then controls the IC tag reader 68 via the auxiliary instrument side wiring 65 on the basis of the inputted control signal, to cause the IC tag reader 68 to read information in each IC tag 69. Each IC tag 69 is preattached to an article, and holds information about the article therein.

Concretely, for example, the user inputs an instruction to check the status of use of the article storage auxiliary instrument 6d from the input unit 54 of the user interface device 5. The instruction to check the status of use that is inputted from the input unit 54 is outputted to the drive controlling device 4, and the operation information receiving unit 41 of the drive controlling device 4 receives the instruction to check the status of use as operation information. The control unit 45 of the drive controlling device 4 then outputs a control signal for causing the status of use inside the article storage auxiliary instrument 6d to be checked to the article storage auxiliary instrument 6d on the basis of the operation information. The control signal outputted from the drive controlling device 4 is inputted to the control board 62, as mentioned above, and the IC tag reader 68 is controlled.

The control board 62 then acquires the information of each IC tag 69 that the IC tag reader 68 has read, and outputs the information to the drive controlling device 4.

The information of each IC tag 69 that is outputted from the control board 62 is inputted to the drive controlling device 4 via an auxiliary instrument side terminal 63 of the article storage auxiliary instrument 6d, a terminal 14 of the body portion 2, and the wiring 13 in the body portion 2.

An IC tag information acquiring unit (not illustrated) of the drive controlling device 4 acquires the information of each IC tag 69 that is outputted from the control board 62, and outputs the information to the control unit 45. The control unit 45 causes the display unit 51 of the user interface device 5 to display information about an article, the information being based on the information of each IC tag 69 that is outputted from the IC tag information acquiring unit.

As a result, by checking the display unit 51, the user can check the status of use of the article storage auxiliary instrument 6d, such as what kinds of articles are stored in the article storage auxiliary instrument 6d while being carried, without having to look into the article storage auxiliary instrument 6d from above the article storage auxiliary instrument.

As mentioned above, the article carrying robot 1 of Embodiment 1 can provide the user with, as an added value, an article checking service function of being able to perform a check of the status of use of the article storage auxiliary instrument 6d in which articles being carried are stored, while implementing stable traveling. This article carrying robot 1 is a service robot that can provide the user with a carrying method that is more comfortable compared with that provided by physical distribution robots that simply carry articles.

Further, the article carrying robot 1 of Embodiment 1 provides various users, such as elderly persons, children, or wheelchair users, with a user interface making it possible for users to easily perform an operation or the like on the article carrying robot 1 while stable traveling is implemented.

Hereafter, the user interface that the article carrying robot 1 has will be explained.

Figure 8:
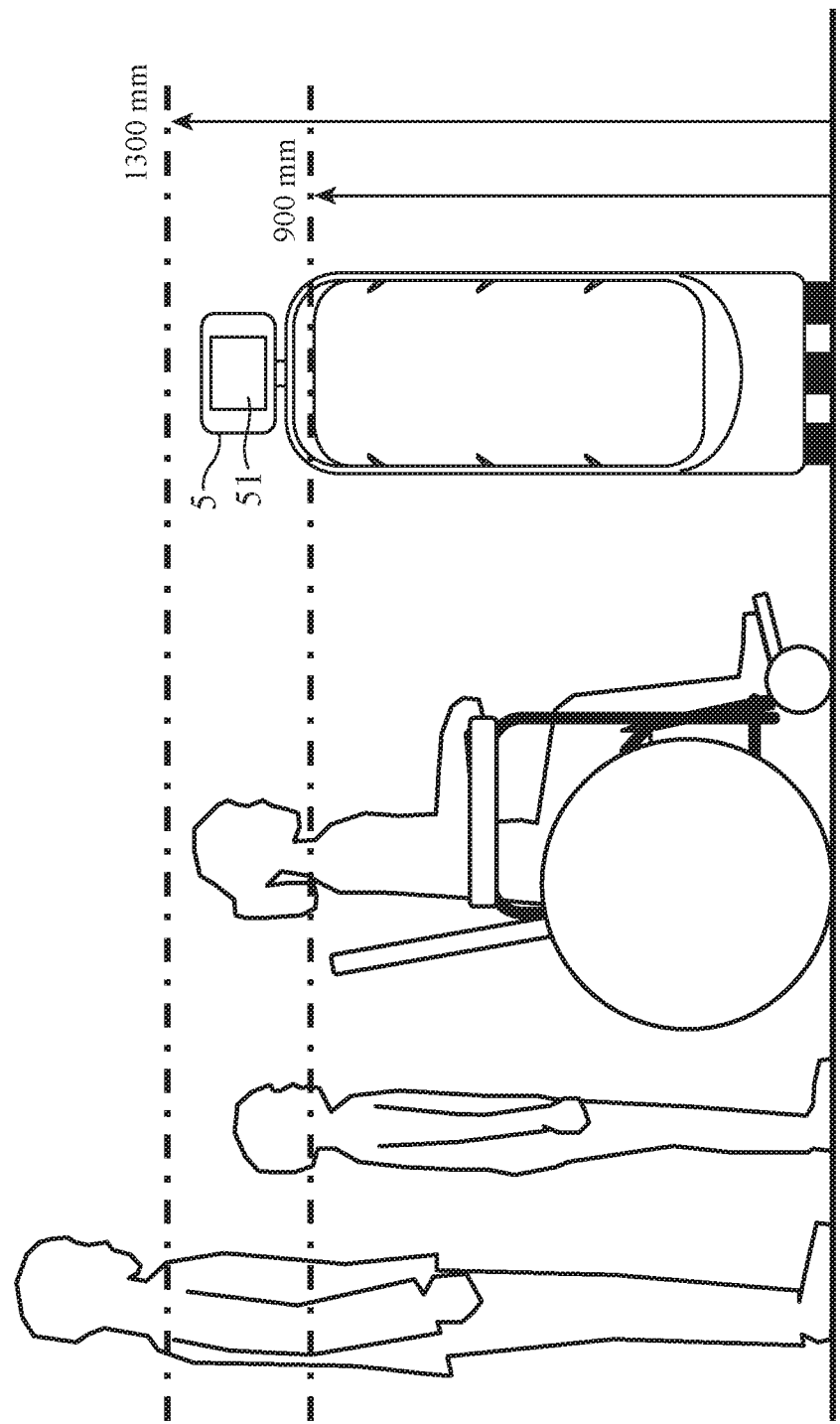
FIG. 8 is a diagram for explaining an example of the mounting position of a user interface device that the article carrying robot includes in Embodiment 1.

FIG. 8 is a diagram for explaining an example of the mounting position of the user interface device 5 that the article carrying robot 1 includes in Embodiment 1.

The user interface device 5 is mounted in such a way that the display unit 51 faces a user at the average eye level of users.

The level of users' eyes should just be, for example, the average level of elderly persons' eyes, children's eyes, or wheelchair users' eyes, and, typically, should just be the one that makes it possible for users, such as elderly persons, children, or wheelchair users, to check the display unit 51 in a natural posture without having to make a motion such as stretching. Preferably, the center position in a height direction of the display unit 51 is at a height of approximately 900 mm to 1,300 mm from the ground contact surface of the article carrying robot 1.

The display unit 51 displays various pieces of information to be provided for a user.

The user operates the article carrying robot 1 in an interactive mode by, for example, inputting a desired operation from the input unit 54, the sound input/output unit 52, or the like disposed in the user interface device 5.

The display unit 51 can display an image or video imitating, for example, a human face. Concretely, the control unit 45 of the drive controlling device 4 instructs the display data generating unit 462 to generate a face image or video imitating a human face. The display control unit 472 then causes the display unit 51 to display an image or video corresponding to data for display that is generated by the display data generating unit 462 on the basis of the instruction from the control unit 45.

FIG. 9 is a diagram for explaining an example of a video displayed on the display unit 51 and imitating a human face in Embodiment 1.

Figure 9A:
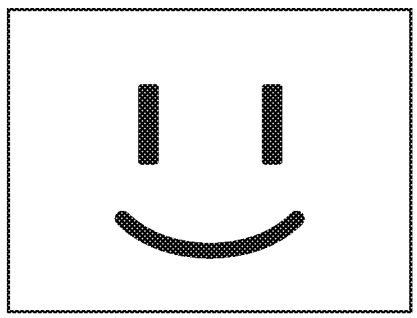
FIG. 9 are diagrams for explaining an example of a video displayed on a display unit and imitating a human face in Embodiment 1.

For example, when the article carrying robot 1 is in a waiting state before the reception of an operation from a user, the display unit 51 displays a waiting screen in which a video imitating a human face by showing eyes and a mouth is played back, as shown in FIG. 9A.

Figure 9B:
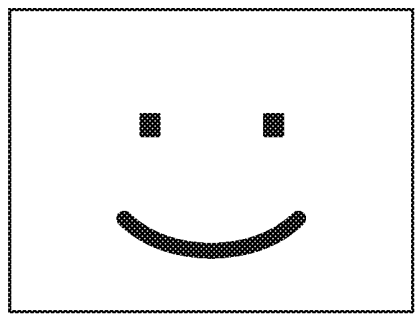

Further, for example, the display unit 51 may display a video in which a graphic showing eyes sometimes becomes reduced and deformed in upward and downward directions or in which a graphic showing eyes blinks (refer to FIG. 9B).

Figure 9C:
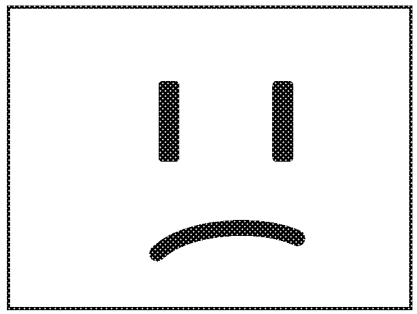

Further, for example, the display unit 51 may display a video in which the position of a graphic showing eyes is moved in rightward and leftward directions and the shape of a graphic showing a mouth is made to become deformed, so that the video looks as if the human face is looking for the user (refer to FIG. 9C).

By displaying an image or video imitating a human face in this way, the display unit 51 allows the user to feel an affinity with the article carrying robot 1 that is a machine, and makes it easy for the user to operate the article carrying robot.

Further, while displaying an image or video imitating a human face on the display unit 51, the article carrying robot 1 outputs a sound from the sound input/output unit 52, so that the user can operate the article carrying robot 1 by interacting with the article carrying robot 1 via voice. A sound that the sound input/output unit 52 outputs is based on sound data that the control unit 45 of the drive controlling device 4 causes the sound data generating unit 461 to generate and then causes the sound output control unit 471 to output.

Figure 9D:
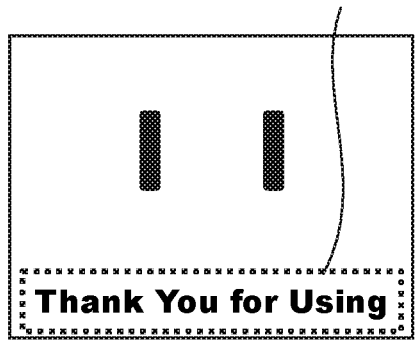

For example, in a case in which a video is displayed on the display unit 51 and a sound is outputted from the sound input/output unit 52 when the user operates the article carrying robot 1, when displaying a video imitating a human face, the display unit 51 can also display characters in an interaction having content that is the same as that outputted via voice at a position where a graphic showing a mouth is displayed (refer to FIG. 9D). The drive controlling device 4 performs control to display the characters in the interaction. Concretely, the control unit 45 of the drive controlling device 4 instructs the display data generating unit 462 to generate, as data for display, for example, text data in which sound data that the sound data generating unit 461 is caused to generate is converted into a text. The display control unit 472 then causes the display unit 51 to display the data for display generated by the display data generating unit 462.

As a result, the article carrying robot 1 enables the user to operate the article carrying robot 1 when the user is a visually or hearing impaired person or when the user operates the article carrying robot 1 under noise.

Figure 10A:
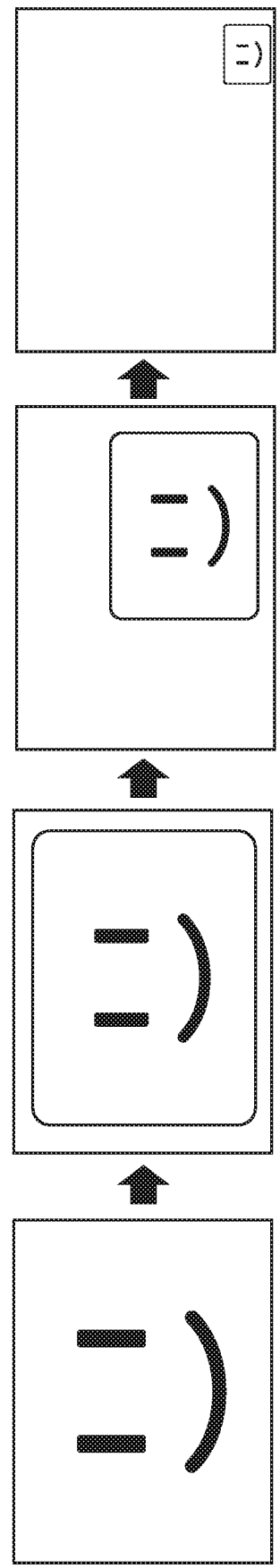
FIG. 10 are diagrams showing an example of a screen in a case of gradually reducing a face video currently being displayed on the display unit, the video imitating eyes and a mouth, in Embodiment 1.

Further, the display unit 51 can display the image or video imitating a human face while reducing the size in which the image or video is displayed. Concretely, for example, when a user performs an operation of, for example, touching an operation start button (not illustrated) displayed on the display unit 51, to input an instruction to start an operation on the article carrying robot 1, the operation information receiving unit 41 of the drive controlling device 4 receives the instruction to start the operation, and outputs, as operation information, the received instruction to the control unit 45. The control unit 45 instructs the display control unit 472 to display the image or video that has been displayed as a waiting screen and that imitates a human face while gradually reducing the image or video. The display control unit 472 then causes the display unit 51 to gradually reduce the image or video currently being displayed and imitating a human face, and display the image or video (refer to FIG. 10A).

Figure 10B:
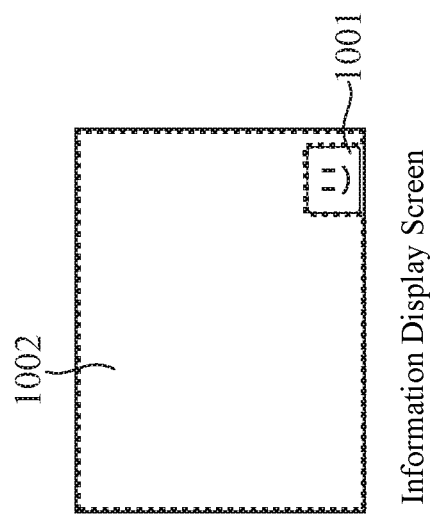

As a result, in the display unit 51, a face display area 1001 in which the image or video imitating a human face is displayed is reduced, so that an information display area 1002 can be ensured (refer to FIG. 10B).

Figure 11:
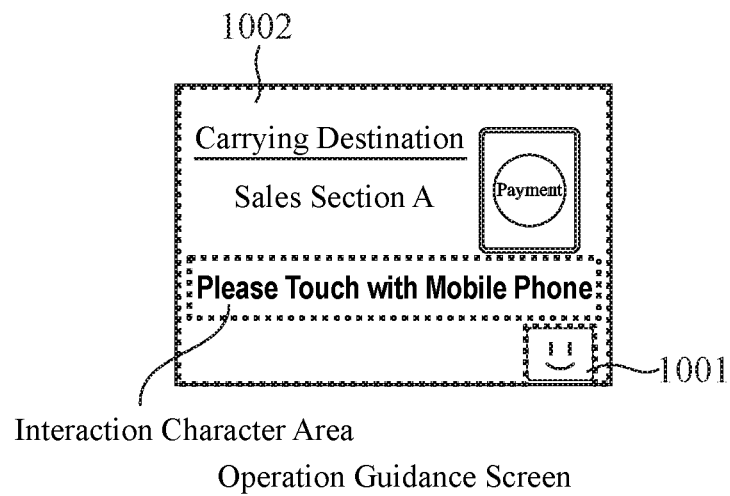
FIG. 11 is a diagram showing an example of an information display area and a face display area of the display unit in Embodiment 1.

The control unit 45 of the drive controlling device 4 causes, for example, a reception screen for receiving an operation from a user to be displayed in the information display area 1002 (refer to FIG. 11).

Further, the control unit 45 causes, for example, an image or video based on the operation received from the user, such as information about a traveling direction of the article carrying robot 1 or a traveling route of the article carrying robot 1, the traveling direction or route being calculated on the basis of an instruction from the user, to be displayed in the information display area 1002.

Further, for example, the control unit 45 of the drive controlling device 4 can cause information about the temperature in the article storage auxiliary instrument 6, information about the state of storage of articles, and so on as explained using FIGS. 5 to 7 to be displayed in the information display area 1002.

When causing information based on the user's operation, such as a reception screen as mentioned above, to be displayed in the information display area 1002, the control unit 45 of the drive controlling device 4 causes the image or video imitating a human face to be displayed in a part of the screen of the display unit 51 while reducing the image or video, as shown in FIG. 108. The position of the face display area 1001 in which the image or video imitating a human face is displayed while being reduced, the position being on the screen of the display unit 51, should just be an appropriate one.

As mentioned above, by causing the image or video imitating a human face to be displayed while reducing the image or video also when information based on a user's operation, such as a reception screen for receiving an operation, or information about a travelling route of the article carrying robot 1, is displayed in the information display area 1002, the article carrying robot 1 can provide the user with consistent usability along with continuous interactivity.

As mentioned above, the article carrying robot 1 of Embodiment 1 can provide a user interface user-friendly for various users such as elderly persons, children, wheelchair users, visually impaired persons, or hearing impaired persons. Further, the article carrying robot 1 of Embodiment 1 can provide a user interface that makes it possible for users to easily perform an operation or communications.

As mentioned above, according to Embodiment 1, the article carrying robot 1 is constructed in such a way as to include: the bottom portion 24 having the traveling portion 3; the body portion 2 having the first pillar portion 21 and the second pillar portion 22 extending in a vertical direction, respectively, from one end and another end in a horizontal direction of the bottom portion 24, and the top portion 23 in which one end is connected to an end of the first pillar portion 21 that is opposite to the bottom portion 24, and another end is connected to an end of the second pillar portion 22 that is opposite to the bottom portion 24; the article storage portion 11 that forms the opening by means of the first pillar portion 21, the second pillar portion 22, the top portion 23, and the bottom portion 24 in such a way that the opening penetrates the body portion 2; and fixing portions 12 disposed in the first and second pillar portions 21 and 22 so as to sandwich the opening and pair up with each other, for fixing an article storage auxiliary instrument 6. Therefore, a deviation of the center of gravity of the article carrying robot is prevented, and stable traveling can be implemented.

Further, the article carrying robot 1 includes the wiring 13 disposed inside the first and second pillar portions 21 and 22, for passing electric power and a control signal therethrough, and a terminal 14 disposed in the first pillar portion 21, the second pillar portion 22, the top portion 23, or the bottom portion 24 (an upper surface of the traveling portion 3), the wiring being connected to the terminal, and when the article storage auxiliary instrument 6 is fixed to the fixing portions 12, the terminal 14 is connected to an auxiliary instrument side terminal 63 disposed in the article storage auxiliary instrument 6, and the wiring 13 and the auxiliary instrument side wiring 65 disposed in the article storage auxiliary instrument 6 are connected. Therefore, the article carrying robot can provide, as an added value, an article management service function of being able to perform, for example, temperature control on articles being carried, or the like while implementing stable traveling.

Further, the article carrying robot 1 is constructed in such a way that the article carrying robot includes the user interface device 5 mounted in the first pillar portion 21, the second pillar portion 22, or the top portion 23, and having the display unit 51, and the user interface device 5 is constructed in such a way that the display unit 51 is mounted at the average level of users' eyes. Therefore, it is possible to provide the article carrying robot that can be easily operated by various users such as adults in a standing position, children, or wheelchair users.

Further, the user interface device 5 includes the display unit 51 and the sound input/output unit 52 and performs screen display and sound output simultaneously, thereby making it possible for users, such as visually or hearing impaired persons, or users who operate the article carrying robot under noise to perform an operation on the article carrying robot.

Further, the drive controlling device 4 causes the display unit 51 to display an image or video imitating a human face in a waiting screen for waiting for input of an operation from a user. Therefore, the user can operate the article carrying robot while having an affinity.

Embodiment 2

In Embodiment 1, in the article storage portion 11 that forms the opening in such a way that the opening penetrates the body portion 2 of the article carrying robot 1, the opening is formed, in a horizontal direction parallel to the direction in which the traveling portion 3 travels, by means of the first pillar portion 21, the second pillar portion 22, the top portion 23, and the bottom portion 24.

In Embodiment 2, an embodiment in which in an article storage portion 11a formed in a body portion 2a of an article carrying robot 1a, an opening is formed, in a horizontal direction perpendicular to a traveling direction in which a traveling portion 3 travels, by means of a first pillar portion 25, a second pillar portion 26, a top portion 23, and a bottom portion 24 will be explained.

The direction in which the traveling portion 3 travels is a main direction when the article carrying robot 1 travels, and is designed in advance in such a way that when the article carrying robot 1 travels a relatively long distance, the article carrying robot 1 is oriented toward a determined direction with respect to the traveling direction.

In Embodiment 2, it is assumed that, for example, the article carrying robot 1 is made to travel without taking up a lot of space in a horizontal direction because, for example, a passage through which the article carrying robot 1 travels is narrow.

Therefore, in Embodiment 2, it is assumed that the direction designed in advance as the direction in which the traveling portion 3 travels is the one in which the article carrying robot 1 travels in such a way that the first pillar portion 25 and the second pillar portion 26 have a front and rear positional relationship with respect to the traveling direction. In Embodiment 2, the horizontal width of each of the first and second pillar portions 25 and 26 is smaller than the width of a side of each of the top and bottom portions 23 and 24, the side being in contract with neither the first pillar portion 25 nor the second pillar portion 26.

Figure 12:
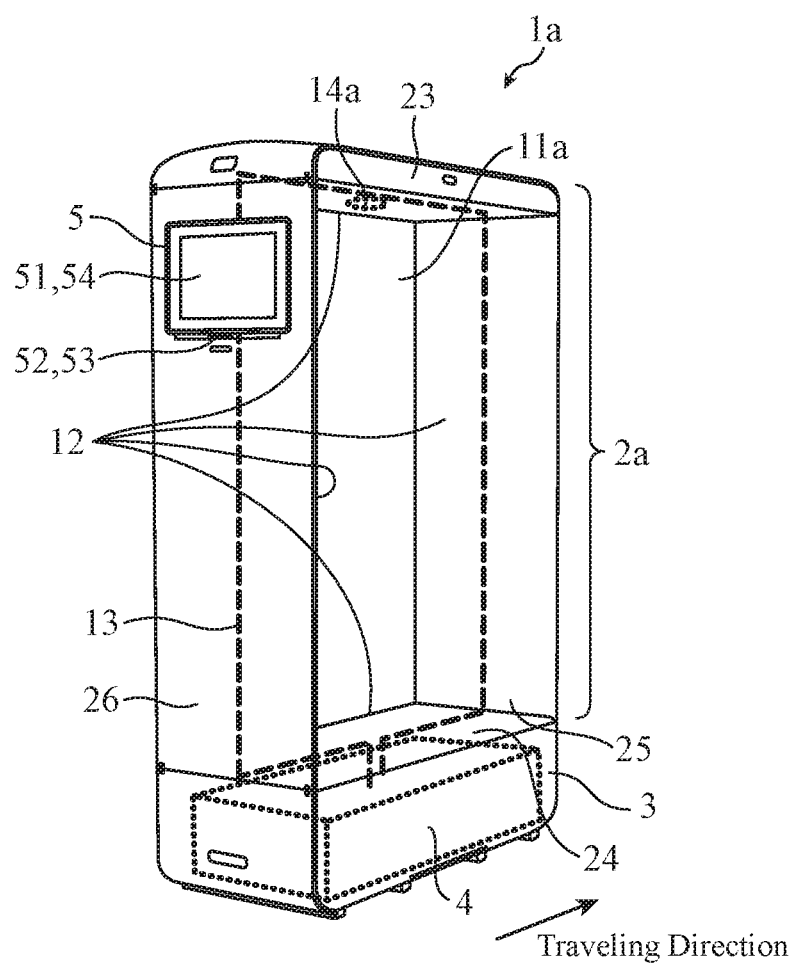
FIG. 12 is a perspective view showing an example of an overview of an article carrying robot of Embodiment 2.

FIG. 12 is a perspective view showing an example of an overview of the article carrying robot 1a of Embodiment 2.

In the article carrying robot 1a shown in FIG. 12, the same components as those of the article carrying robot 1 explained using FIG. 1 in Embodiment 1 are denoted by the same reference signs, and a duplicate explanation will be omitted.

The article carrying robot 1a has the body portion 2a and the traveling portion 3.

The body portion 2a of the article carrying robot 1 has the article storage portion 11a and fixing portions 12.

The article storage portion 11a forms the opening in the body portion 2a in such a way that the opening penetrates the body portion 2a in horizontal direction.

In Embodiment 2, the article storage portion 11a forms the opening in such a way that the opening penetrates the body portion 2a in a horizontal direction perpendicular to the direction in which the traveling portion 3 travels. In Embodiment 2, the term "horizontal" includes substantially horizontal, and the term "perpendicular" includes substantially perpendicular.

In the opening that the article storage portion 11a forms, one or more article storage auxiliary instruments 6 each of which is an auxiliary instrument for storing articles are fixed.

The body portion 2a has the first pillar portion 25, the second pillar portion 26, the top portion 23, and the bottom portion 24. The top portion 23 has a form in which one end is connected to an end of the first pillar portion 25 that is opposite to the bottom portion 24, and another end is connected to an end of the second pillar portion 26 that is opposite to the bottom portion 24. The bottom portion 24 has the traveling portion 3 while being a part of the body portion 2a. The first pillar portion 25 and the second pillar portion 26 have forms in which the first and second pillar portions extend in a vertical direction, respectively, from one end and another end in a horizontal of the bottom portion 24.

The article storage portion 11a forms the opening in the body portion 2a by means of the first pillar portion 25, the second pillar portion 26, the top portion 23, and the bottom portion 24. More specifically, the periphery of the opening formed by the article storage portion 11a is defined by the first pillar portion 25, the second pillar portion 26, the top portion 23, and the bottom portion 24.

In the first pillar portion 25 and the second pillar portion 26, multiple fixing portions 12 for fixing the one or more article storage auxiliary instruments 6 in the opening formed by the article storage portion 11 are disposed in such a way as to make one or more pairs with the opening formed by the article storage portion 11a being sandwiched by the one or more pairs.

Two fixing portions 12 that pair up with each other are disposed at the same height in the vertical direction in the first pillar portion 25 and the second pillar portion 26, and horizontally fix one article storage auxiliary instrument 6. In Embodiment 2, the term "the same height in the vertical direction" includes substantially the same height in the vertical direction, and the term "the vertical direction" includes a substantially vertical direction. The fixing portions 12 should just fix one article storage auxiliary instrument 6 to such an extent that articles stored in the article storage auxiliary instrument 6 are not caused to be inclined and deviated in their positions in a state in which the article storage auxiliary instrument 6 is fixed to the opening formed by the article storage portion 11.

For the sake of simplicity in the explanation, an illustration of the fixing portions is omitted in FIG. 12, and the details of the fixing portions will be described together with a concrete method of fixing an article storage auxiliary instrument 6.

Wiring 13a is disposed inside the first pillar portion 25, the second pillar portion 26, the top portion 23, and the bottom portion 24 of the body portion 2. The wiring 13a is used for making electric power from a rechargeable battery (not illustrated) included in the article carrying robot 1a, and a control signal from a drive controlling device 4 pass therethrough. The wiring 13a is connected, via a terminal 14a, to auxiliary instrument side wiring 65 that an article storage auxiliary instrument 6 has. Further, the wiring 13a is connected to the drive controlling device 4 and a user interface device 5.

Although the terminal 14a is disposed in the top portion 23 in Embodiment 2, as shown in FIG. 12, the position at which the terminal 14a is disposed is not limited to this example. The terminal 14 should just be arranged at a proper position at which the terminal can be connected to an auxiliary instrument side terminal 63 that an article storage auxiliary instrument 6 fixed to fixing portions 12 has so that the supply of electric power from the wiring 13 and the transmission of a control signal to the article storage auxiliary instrument 6 can be performed.

In Embodiment 2, the user interface device 5 is disposed on a surface of the second pillar portion 26 that the body portion 2a has, the surface being opposite to a surface on a side of the opening formed by the article storage portion 11a.

The user interface device 5 is mounted in such a way that a display unit 51 faces a user at the average level of users' eyes, like that of Embodiment 1.

Figure 13:
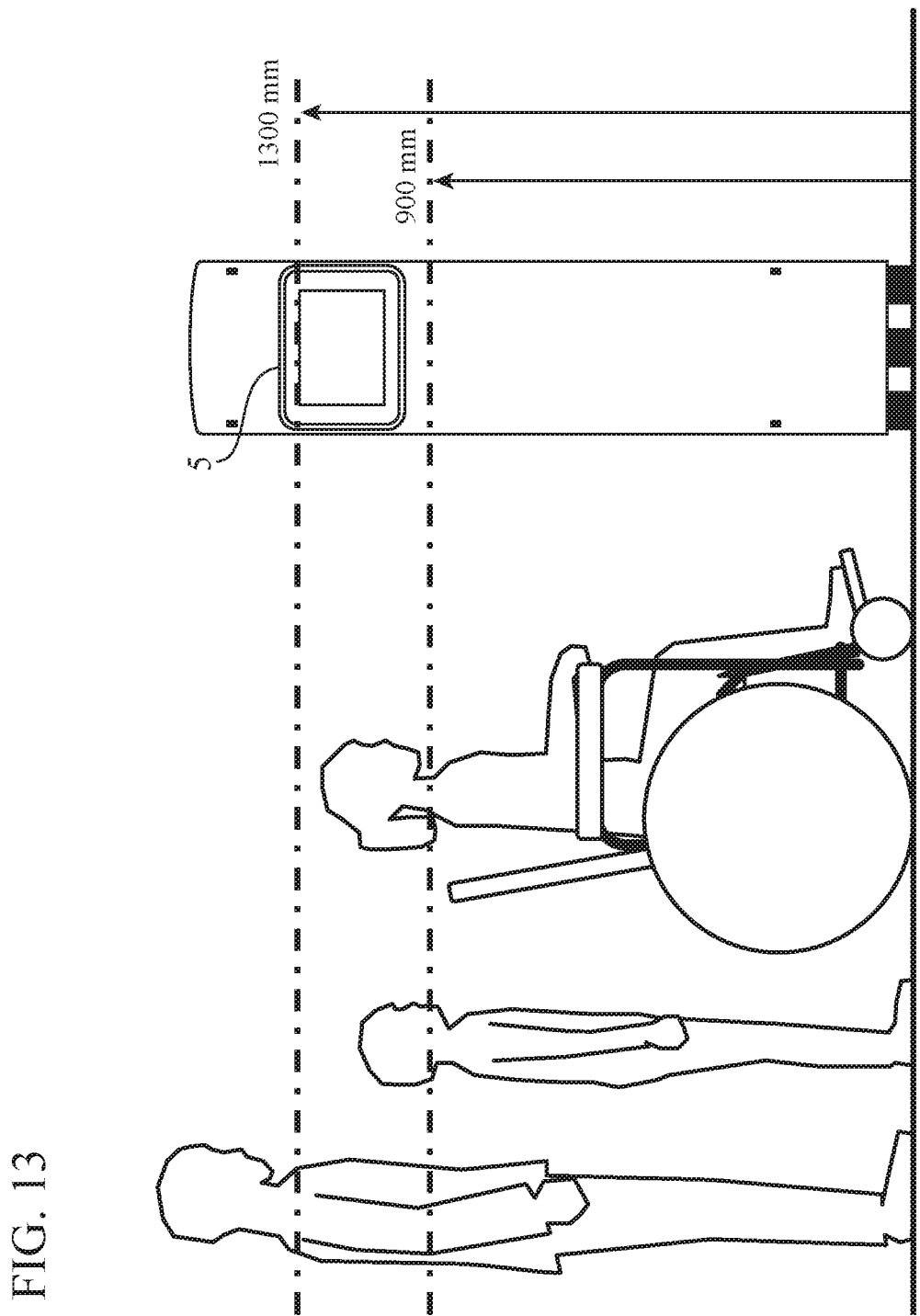
FIG. 13 is a diagram for explaining an example of the mounting position of a user interface device that the article carrying robot includes in Embodiment 2.

The level of users' eyes should just be, for example, the average level of elderly persons' eyes, children's eyes, or wheelchair users' eyes, and, typically, should just be the one that makes it possible for users, such as elderly persons, children, or wheelchair users, to check the display unit 51 in a natural posture without having to make a motion such as stretching. Preferably, the center position in a height direction of the display unit 51 is at a height of approximately 900 mm to 1,300 mm from a ground contact surface of the article carrying robot 1 (refer to FIG. 13).

Next, an article storage auxiliary instrument 6 that is attachably/detachably fixed in the opening formed by the article storage portion 11a will be explained.

Figure 14A:
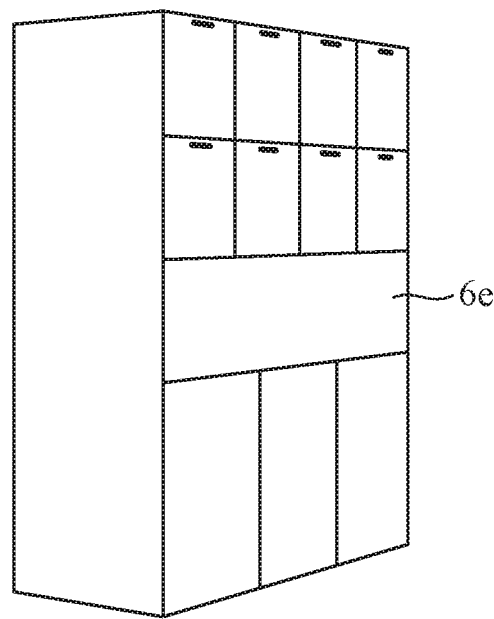
FIG. 14A shows an example of a storage-cabinet-shaped article storage auxiliary instrument.
Figure 14B:
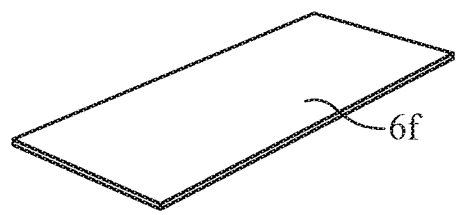
FIG. 14B shows an example of a shelf-shaped article storage auxiliary instrument.

FIG. 14 is a diagram for explaining an example of an article storage auxiliary instrument 6 fixed in the opening formed by the article storage portion 11a in the article carrying robot 1a of Embodiment 2, FIG. 14A shows an example of a storage-cabinet-shaped article storage auxiliary instrument 6e, and FIG. 14B shows an example of a shelf-shaped article storage auxiliary instrument 6f.

Figure 15B:
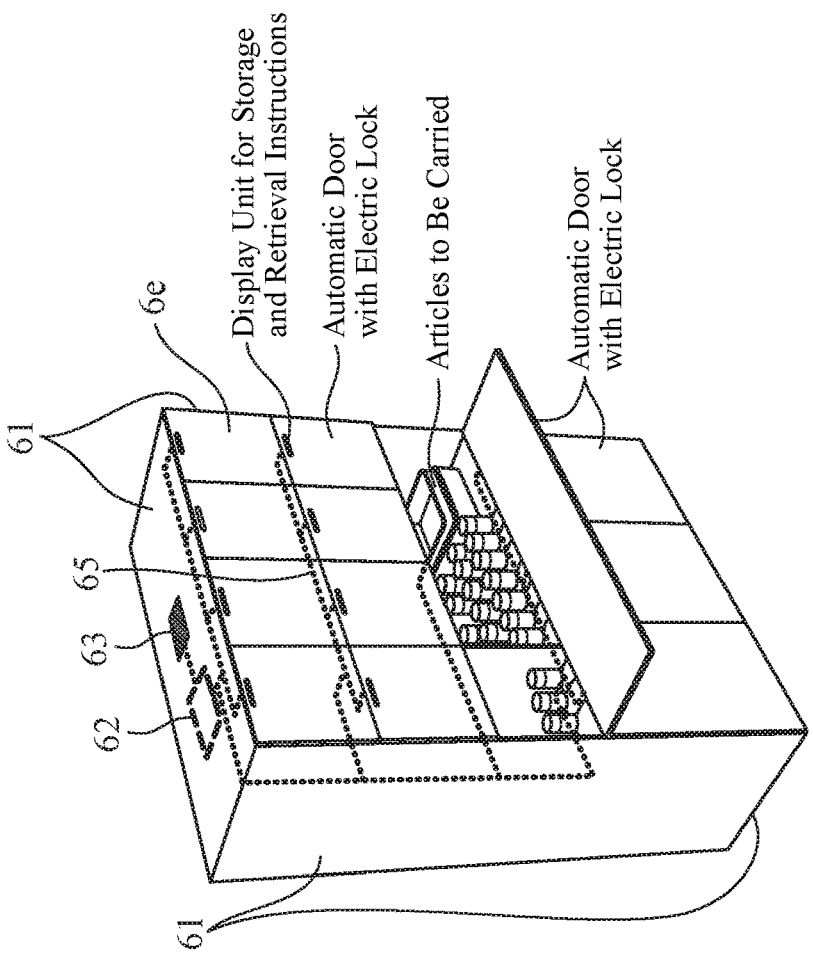
FIG. 15B is a diagram for explaining an example of the structure of the article storage auxiliary instrument.
Figure 15A:
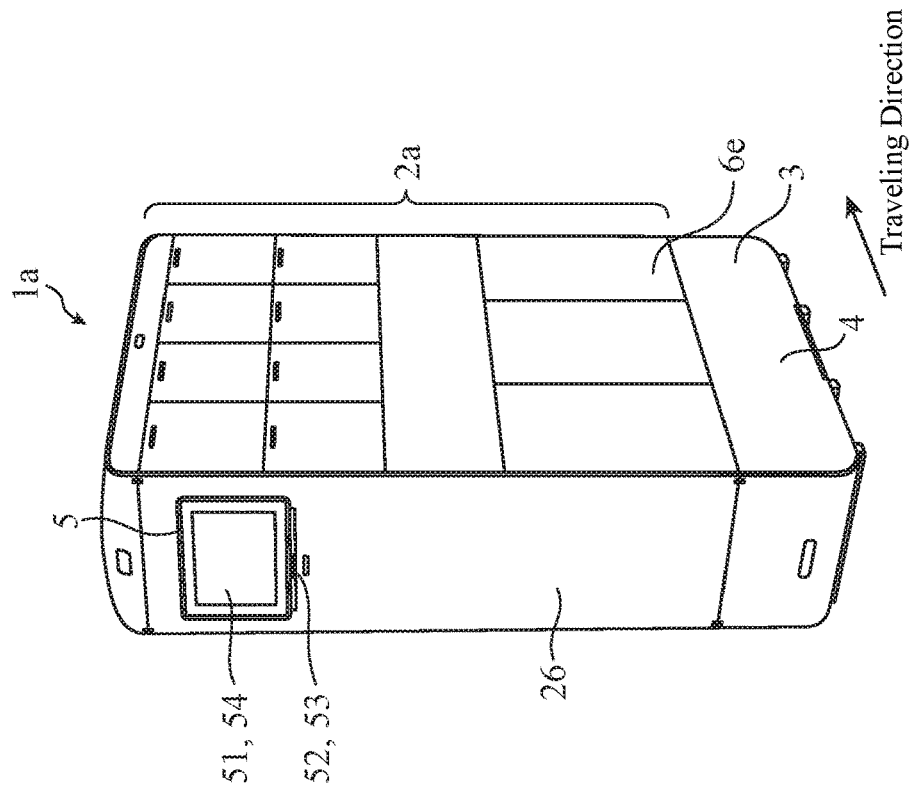
FIG. 15A is a diagram showing an example of a state in which the article storage auxiliary instrument is fixed to the article carrying robot.

FIG. 15 is a diagram explaining an example in a case of using a storage-cabinet-shaped article storage auxiliary instrument 6e as shown in FIG. 14A as an article storage auxiliary instrument 6 in Embodiment 2. FIG. 15A is a diagram showing an example of a state in which the article storage auxiliary instrument 6e is fixed to the article carrying robot 1a, and FIG. 15B is a diagram for explaining an example of the structure of the article storage auxiliary instrument 6e.

In FIG. 15, the same components as those explained using FIG. 4 and so on in Embodiment 1 are denoted by the same reference signs, and a duplicate explanation will be omitted.

The size of the periphery of the article storage auxiliary instrument 6e is substantially the same as that of the opening formed by the article storage portion 11a of the article carrying robot 1a. Further, in a state in which the article storage auxiliary instrument 6e is mounted in the opening formed by the article storage portion 11a, a surface positioned forward with respect to the traveling direction (referred to as the "front surface" hereafter), a surface positioned backward with respect to the traveling direction (referred to as the "rear surface" hereafter), a top surface, and a bottom surface of the article storage auxiliary instrument 6e are, respectively, in contact with the first pillar portion 25, the second pillar portion 26, the top portion 23, and the bottom portion 24 of the body portion 2a (refer to FIG. 15A). More specifically, parts of the front surface, the rear surface, the top surface, and the bottom surface of the article storage auxiliary instrument 6e, the parts being in contact with the body portion 2a, serve as auxiliary instrument side fixing portions 61 in the article storage auxiliary instrument 6e. Further, in the body portion 2a, parts of the first pillar portion 25, the second pillar portion 26, the top portion 23, and the bottom portion 24 of the body portion 2a, the parts being in contact with the article storage auxiliary instrument 6e, serve as the fixing portions 12.

As mentioned above, the fixing portions 12 may be disposed not only at substantially the same height in the vertical direction in the first pillar portion 25 or the second pillar portion 26 of the body portion 2a, but also in the top portion 23 or the bottom portion 24 of the body portion 2a.

When the article storage auxiliary instrument 6e is fixed in the opening formed by the article storage portion 11a of the article carrying robot 1a, the article storage auxiliary instrument 6e is fixed in the opening formed by the article storage portion 11a because of contact with almost no gap between the fixing portions 12 and the auxiliary instrument side fixing portions 61, as shown in FIG. 15A.

As a result, because the articles stored in the article storage auxiliary instrument 6e can be arranged on the vertical line of the center of gravity of the article carrying robot 1a, the article carrying robot 1a can suppress a deviation of the center of gravity and implement stable traveling.

Further, as shown in FIG. 15B, a control board 62 is disposed inside a top plate of the article storage auxiliary instrument 6e. Further, an auxiliary instrument side terminal 63 is disposed on a surface of the top plate of the article storage auxiliary instrument 6e, the surface being on the side opposite to the side of the opening formed by the article storage portion 11a. The auxiliary instrument side terminal 63 is connected to the terminal 14a.

The auxiliary instrument side terminal 63 is not necessarily disposed in the top plate of the article storage auxiliary instrument 6e, and should just be disposed at a proper position at which the auxiliary instrument side terminal is connected to the terminal 14a of the body portion 2a.

Further, a door for putting articles in and out that the article storage auxiliary instrument 6e has is, for example, an automatic door with an electric lock.

Further, in the automatic door with an electric lock that the article storage auxiliary instrument 6e has, for example, a display unit for storage and retrieval instructions may be disposed.

The auxiliary instrument side terminal 63, the automatic door with an electric lock, and the display unit for storage and retrieval instructions are connected to the control board 62 by the auxiliary instrument side wiring 65 arranged inside the article storage auxiliary instrument 6e.

When a control signal to cause control of an opening or closing operation on the automatic door with an electric lock to be performed is outputted from the drive controlling device 4, the control signal is inputted to the control board 62 via the auxiliary instrument side terminal 63 and the auxiliary instrument side wiring 65 of the article storage auxiliary instrument 6e. The control board 62 then controls the opening or closing operation on the automatic door with an electric lock via the auxiliary instrument side wiring 65 on the basis of the inputted control signal.

Concretely, for example, a user inputs an instruction to open the automatic door of the article storage auxiliary instrument 6e from an input unit 54 of the user interface device 5, or the like. The instruction to open the automatic door, which is inputted from the input unit 54 or the like, is outputted to the drive controlling device 4, and the operation information receiving unit 41 of the drive controlling device 4 receives the instruction to open the automatic door as operation information. The control unit 45 of the drive controlling device 4 then outputs a control signal to cause the automatic door with an electric lock of the article storage auxiliary instrument 6e to be opened to the article storage auxiliary instrument 6e on the basis of the operation information. The control signal outputted from the drive controlling device 4 is inputted to the control board 62, as mentioned above, and the opening or closing operation on the automatic door with an electric lock is controlled.

Further, at this time, the control unit 45 of the drive controlling device 4 outputs, for example, a control signal to light up the display unit for storage and retrieval instructions.

When the automatic door with an electric lock is opened, the display unit for storage and retrieval instructions is lighted up on the basis of the control signal. The user can grasp the position at which the automatic door is opened, and so on in an instant by checking the lighting.

As mentioned above, the article carrying robot 1a of Embodiment 2 can provide, as an added value, an article management service function of being able to automatically open and close the door of the article storage auxiliary instrument 6e that stores articles being carried, while implementing stable traveling. This article carrying robot 1a is a service robot that can provide the user with a carrying method that is more comfortable compared with that provided by physical distribution robots that simply carry articles.

Figure 16B:
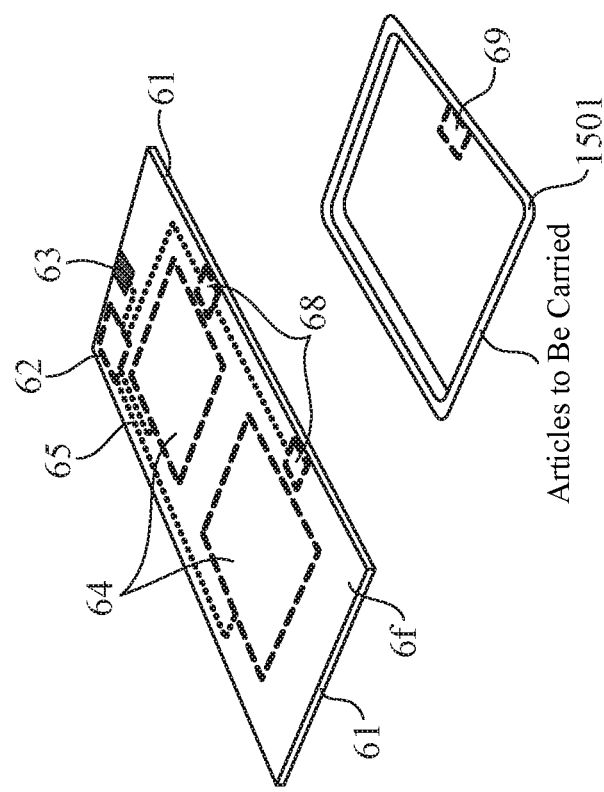
FIG. 16B is a diagram for explaining an example of the structure of the article storage auxiliary instrument.
Figure 16A:
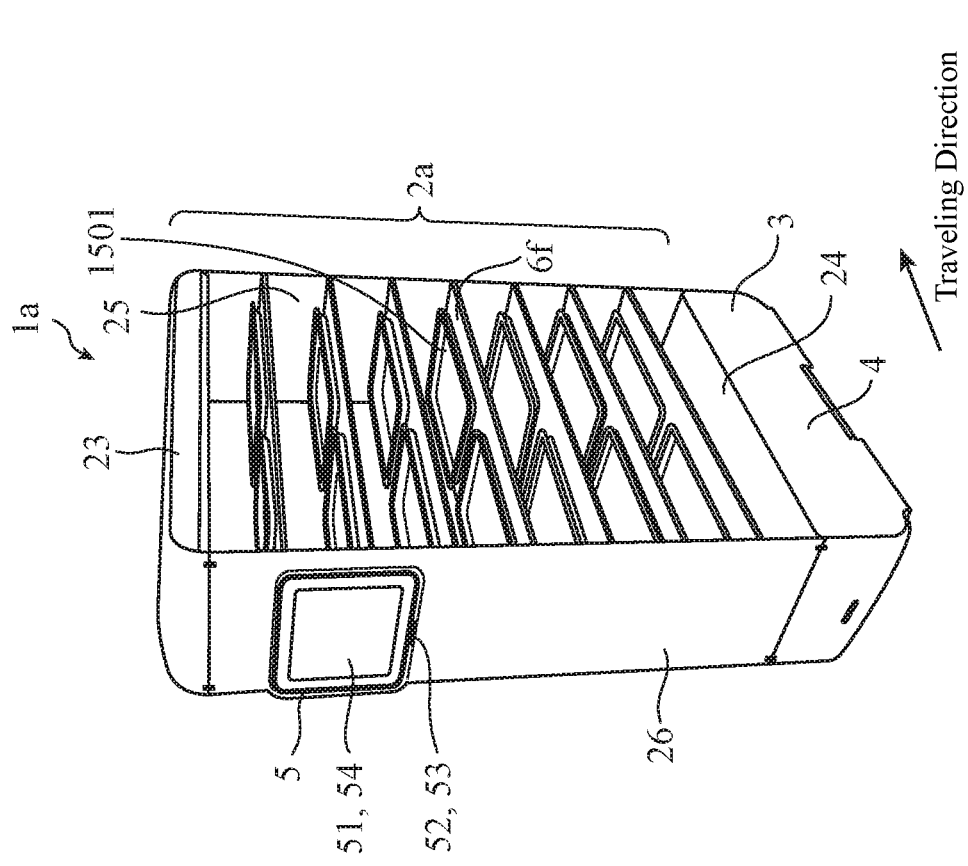
FIG. 16A is a diagram showing an example of a state in which the article storage auxiliary instrument is fixed to the article carrying robot.

FIG. 16 is a diagram explaining an example in a case of using a shelf-shaped article storage auxiliary instrument 6f as shown in FIG. 14B as each article storage auxiliary instrument 6 in Embodiment 2. FIG. 16A is a diagram showing an example of a state in which article storage auxiliary instruments 6f are fixed to the article carrying robot 1a, and FIG. 16B is a diagram for explaining an example of the structure of each article storage auxiliary instrument 6f.

In FIG. 16, the same components as those explained using FIG. 4 and so on in Embodiment 1 are denoted by the same reference signs, and a duplicate explanation will be omitted.

As shown in FIG. 16B, each side wall of one set of side walls facing each other of each article storage auxiliary instrument 6f serves as an auxiliary instrument side fixing portion 61 engaged with a fixing portion 12.

When an article storage auxiliary instrument 6f is fixed in the opening foil ied by the article storage portion 11a of the article carrying robot 1, a pair of fixing portions 12 and the pair of auxiliary instrument side fixing portions 61 are engaged with each other, and the article storage auxiliary instrument 6f is placed in a state in which the article storage auxiliary instrument is fixed horizontally. Articles are stored in, for example, a tray 1501 mounted on the article storage auxiliary instrument 6f, and are carried.

In each of the auxiliary instrument side fixing portions 61, an auxiliary instrument side terminal 63 that can be connected to a terminal 14a is disposed. In the article carrying robot 1*a*, a terminal 14*a* is disposed only in one of fixing portions 12 that pair up with each other, like a terminal 14 of Embodiment 1.

Further, as shown in FIG. 16B, auxiliary instrument side wiring 65 is disposed inside the article storage auxiliary instrument 6*f*. Further, a control board 62, heat transfer elements 64, and IC tag readers 68 are disposed at arbitrary locations inside the article storage auxiliary instrument 6*f*.

The auxiliary instrument side terminal 63, the heat transfer elements 64, and the IC tag readers 68 are connected to the control board 62 by the auxiliary instrument side wiring 65.

Further, an IC tag 69 is disposed in the tray 1501.

When an article storage auxiliary instrument 6*f* is fixed in the opening formed by the article storage portion 11*a* of the article carrying robot 1*a*, a terminal 14*a* and the auxiliary instrument side terminal 63 of the article storage auxiliary instrument 6*f* are connected, and the wiring 13 and the auxiliary instrument side wiring 65 inside the article storage auxiliary instrument 6*f* are electrically connected.

When a control signal to cause the status of use of the article storage auxiliary instrument 6*f* to be checked is outputted from the drive controlling device 4, the control signal is inputted to the control board 62 via the auxiliary instrument side terminal 63 of the article storage auxiliary instrument 6*f*, and the auxiliary instrument side wiring 65. The control board 62 then controls the IC tag readers 68 via the auxiliary instrument side wiring 65 on the basis of the inputted control signal, and causes the IC tag readers 68 to read the IC tag 69.

Concretely, for example, a user inputs an instruction to check the status of use of the article storage auxiliary instrument 6*f* from the input unit 54 of the user interface device 5, or the like. The instruction to check the status of use inputted from the input unit 54 or the like is outputted to the drive controlling device 4, and the operation information receiving unit 41 of the drive controlling device 4 receives the instruction to check the status of use as operation information. The control unit 45 of the drive controlling device 4 then outputs a control signal to cause the status of use of the article storage auxiliary instrument 6*f* to be checked to the article storage auxiliary instrument 6*f* on the basis of the operation information. The control signal outputted from the drive controlling device 4 is inputted to the control board 62, as mentioned above, and the IC tag reader 68 is controlled.

The control board 62 then acquires information in the IC tag 69 read by the IC tag reader 68, and outputs the information to the drive controlling device 4.

The information in the IC tag 69 outputted from the control board 62 is inputted to the drive controlling device 4 via the auxiliary instrument side terminal 63 of the article storage auxiliary instrument 6*f*, the terminal 14*a*, and the wiring 13.

An IC tag information acquiring unit (not illustrated) of the drive controlling device 4 acquires the information in the IC tag 69 outputted from the control board 62, and outputs the information to the control unit 45. The control unit 45 causes the display unit 51 of the user interface device 5 to display article related information based of the information in the IC tag 69 outputted from the IC tag information acquiring unit, and so on.

As a result, the user can check the status of use of the article storage auxiliary instrument 6*f*, such as what kinds of articles are stored in the tray 1501 on the article storage auxiliary instrument 6*f* and are carried, by checking the display unit 51.

Further, when a control signal to cause temperature control to be performed is outputted from the drive controlling device 4, the control signal is inputted to the control board 62 via the auxiliary instrument side terminal 63 and the auxiliary instrument side wiring 65 of the article storage auxiliary instrument 6*f*. The control board 62 then controls the heat transfer elements 64 via the auxiliary instrument side wiring 65 on the basis of the inputted control signal.

Concretely, for example, a user inputs a desired set temperature from the input unit 54 of the user interface device 5, or the like. Information about the set temperature inputted from the input unit 54 is outputted to the drive controlling device 4, and the operation information receiving unit 41 of the drive controlling device 4 receives the information about the set temperature as operation information. The control unit 45 of the drive controlling device 4 then outputs a control signal to set the article storage auxiliary instrument 6*f* to the user's desired set temperature to the article storage auxiliary instrument 6*f* on the basis of the operation information. The control signal outputted from the drive controlling device 4 is inputted to the control board 62 as mentioned above, and the heat transfer elements 64 are controlled by the control board 62. As a result, the temperature of the article storage auxiliary instrument 6*f* becomes the user's desired set temperature, and the user can cause temperature control to set the articles stored in the tray 1501 mounted in the article storage auxiliary instrument 6*f* to the desired temperature to be performed.

As mentioned above, the article carrying robot 1*a* of Embodiment 2 can provide, as an added value, an article management service function of being able to perform temperature control on articles being carried, while implementing stable traveling. This article carrying robot 1*a* is a service robot that can provide the user with a carrying method that is more comfortable compared with that provided by physical distribution robots that simply carry articles.

As mentioned above, according to Embodiment 2, the article carrying robot 1*a* is constructed in such a way as to include: the bottom portion 24 having the traveling portion 3; the body portion 2*a* having the first pillar portion 25 and the second pillar portion 26 extending in a vertical direction, respectively, from one end and another end in a horizontal direction of the bottom portion 24, and the top portion 23 in which one end is connected to an end of the first pillar portion 25 that is opposite to the bottom portion 24, and another end is connected to an end of the second pillar portion 26 that is opposite to the bottom portion 24; the article storage portion 11*a* that forms the opening by means of the first pillar portion 21, the second pillar portion 22, the top portion 23, and the bottom portion 24 in such a way that the opening penetrates the body portion 2*a* in a horizontal direction perpendicular to the direction in which the traveling portion 3 travels; and fixing portions 12 disposed in the first and second pillar portions 25 and 26 so as to sandwich the opening and pair up with each other, for fixing an article storage auxiliary instrument 6. Therefore, the article carrying robot can suppress a deviation of the center of gravity, and can implement stable traveling.

In above-mentioned Embodiments 1 and 2, the drive controlling device 4 is included in the traveling portion 3 of each of the article carrying robots 1 and 1*a*, as shown in FIGS. 1 and 12, but not limited to this example. The drive controlling device 4 may be included in, for example, each of the body portions 2 and 2*a* of the article carrying robots 1 and 1*a*.

Further, in the above-mentioned Embodiments 1 and 2, each of the article carrying robots 1 and 1*a* includes the user interface device 5, but not limited to this example, and each of the article carrying robots 1 and 1*a* may be constructed so as not to include the user interface device 5.

Further, in the above-mentioned Embodiments 1 and 2, the structure of each of the article carrying robots 1 and 1*a* shown FIGS. 1 and 12 is an example, and, for example, each of the article carrying robots 1 and 1*a* may be constructed in the form of an arm, and include an arm that moves articles within a range in which the robot itself works.

Each of the functions of the drive controlling device 4 shown in the above-mentioned Embodiments 1 and 2 is implemented by a processing circuit. The processing circuit can implement each of the above-mentioned functions by using hardware, software, firmware, or a combination of hardware, software, and firmware. The software and the firmware are described as programs and the programs are stored in a memory. The processing circuit performs the function of each unit by reading and executing a program stored in the memory.

Further, any combination of two or more of the above-mentioned embodiments can be made, various changes can be made in any component according to any one of the above-mentioned embodiments, and any component according to any one of the above-mentioned embodiments can be omitted within the scope of the present disclosure.

INDUSTRIAL APPLICABILITY

Because the article carrying robot according to the present disclosure suppresses a deviation of the center of gravity when articles are stored and can perform stable traveling, the article carrying robot can be used as service robots that carry articles, and so on.

REFERENCE SIGNS LIST

1, 1*a* article carrying robot, 2, 2*a* body portion, 3 traveling portion, 4 drive controlling device, 5 user interface device, 6, 6*a*, 6*b*, 6*c*, 6*d*, 6*e*, 6*f* article storage auxiliary instrument, 7 camera unit, 11, 11*a* article storage portion, 12, 12*a*, 12*b*, 12*c*, 12*d*, 12*e*, 12*f* fixing portion, 13, 13*a* wiring, 14, 14*a* terminal, 21, 25 first pillar portion, 22, 26 second pillar portion, 23 top portion, 24 bottom portion, 41 operation information receiving unit, 42 sensor information receiving unit, 43 position estimating unit, 44 surrounding area map data storage unit, 45 control unit, 46 data generating unit, 47 output control unit, 51 display unit, 52 sound input/output unit, 53, 75 camera, 54 input unit, 61 auxiliary instrument side fixing portion, 62, 73 control board, 63 auxiliary instrument side terminal, 64 heat transfer element, 65 auxiliary instrument side wiring, 66 thermometer, 67*a* electric lock, 67*b* latch, 68 IC tag reader, 69 ID tag, 71 unit side fixing portion, 72 unit side terminal, 74 unit side wiring, 461 sound data generating unit, 462 display data generating unit, 471 sound output control unit, 472 display control unit, 1001 face display area, 1002 information display area, and 1501 tray.

The invention claimed is:

1. An article carrying robot comprising:
   a bottom portion including a traveling portion;
   a body portion including a first pillar portion and a second pillar portion each extending in a vertical direction from one end and another end in a horizontal direction of the bottom portion, and a top portion including one end connected to an end of the first pillar portion that is opposite to the bottom portion and including another end connected to an end of the second pillar portion that is opposite to the bottom portion;
   an article storage portion that forms an opening with the first pillar portion, the second pillar portion, the top portion, and the bottom portion in such a way that the opening penetrates the body portion;
   fixing portions provided in the first and second pillar portions to sandwich the opening and pair up with each other, for fixing an article storage auxiliary instrument; and
   wiring provided inside the first and second pillar portions, for passing electric power and a control signal therethrough; and
   a terminal provided in the first pillar portion, the second pillar portion, the top portion, or an upper surface of the traveling portion, the terminal being connected to the wiring,
   wherein when the article storage auxiliary instrument is fixed to the fixing portions, the terminal is connected to an auxiliary instrument side terminal provided in the article storage auxiliary instrument, and the wiring and auxiliary instrument side wiring provided in the article storage auxiliary instrument are connected.

2. The article carrying robot according to claim 1, wherein the opening penetrates the body portion in a horizontal direction parallel to a direction in which the traveling portion travels.

3. The article carrying robot according to claim 1, wherein the opening penetrates the body portion in a horizontal direction perpendicular to a direction in which the traveling portion travels.

4. The article carrying robot according to claim 1, further comprising a user interface device mounted in the first pillar portion, the second pillar portion, or the top portion, and including a display unit,
   wherein in the user interface device, the display unit is mounted at average eye level of users.

5. The article carrying robot according to claim 4, wherein a center position in a height direction of the display unit is a position 900 to 1,300 mm from a ground contact surface.

6. The article carrying robot according to claim 4, wherein the user interface device further includes an input unit for receiving input of an operation from a user, and a touch panel is provided as the input unit on the display unit.

7. The article carrying robot according to claim 4, wherein the user interface device further includes a sound input-and-output unit.

8. The article carrying robot according to claim 1, wherein the article carrying robot includes an article monitoring device that supplies electric power from the wiring and is attachably and detachably fixed in the opening by each fixing portion and that faces the article storage auxiliary instrument located below the article monitoring device and fixed to the opening.

9. The article carrying robot according to claim 1, wherein the article carrying robot includes an article storage auxiliary instrument that supplies electric power from the wiring and has an automatic door including an electric lock that operates using the electric power.

10. The article carrying robot according to claim 4, wherein the display unit includes: in a waiting screen for waiting for input of an operation from a user, a face display area in which an image or video imitating a human face is displayed; and an information display area in which when input of an operation from a user is received, information based on the received input of the operation is displayed.

11. The article carrying robot according to claim 10, wherein when input of an operation from a user is received, the display unit performs reduced display of the face display area.

* * * * *